(12) United States Patent
Gustavsson

(10) Patent No.: US 11,855,861 B2
(45) Date of Patent: Dec. 26, 2023

(54) HIGH PERFORMANCE PACKET CAPTURE AND ANALYTICS ARCHITECTURE

(71) Applicant: Axellio Inc., Colorado Springs, CO (US)

(72) Inventor: Bo David Gustavsson, Monument, CO (US)

(73) Assignee: Axellio Inc., Colorado Springs, CO (US)

( * ) Notice: Subject to any disclaimer, the term of this patent is extended or adjusted under 35 U.S.C. 154(b) by 136 days.

(21) Appl. No.: 17/332,487

(22) Filed: May 27, 2021

(65) Prior Publication Data

US 2021/0377133 A1    Dec. 2, 2021

Related U.S. Application Data

(60) Provisional application No. 63/031,090, filed on May 28, 2020.

(51) Int. Cl.
*H04L 43/022*    (2022.01)
*H04L 43/04*    (2022.01)
*H04L 43/106*    (2022.01)

(52) U.S. Cl.
CPC .......... *H04L 43/022* (2013.01); *H04L 43/04* (2013.01); *H04L 43/106* (2013.01)

(58) Field of Classification Search
CPC ...... H04L 43/022; H04L 43/04; H04L 43/106
See application file for complete search history.

(56) References Cited

U.S. PATENT DOCUMENTS 6,871,265 B1 *    3/2005    Oren ........................ H04L 43/08
                                                711/108
7,639,613 B1 *    12/2009    Ghannadian .......... H04L 43/026
                                                370/232
(Continued)

FOREIGN PATENT DOCUMENTS

WO    WO-2013-070631 A1    5/2013
WO    WO-2021-243052 A1    12/2021

OTHER PUBLICATIONS

David Smekal et al. "An FPGA-based Priority Packet Queues", Brno University of Technology, The Faculty of Electrical Engineering and Communication, 5 pages. (Year: 2019).*

(Continued)

*Primary Examiner* — George C Neurauter, Jr.
(74) *Attorney, Agent, or Firm* — King Intellectual Asset Management

(57) ABSTRACT

Novel tools and techniques are provided for implementing data packet processing, data packet capture, data packet storage, data packet retrieval, and data packet distribution. In various embodiments, a method might include detecting, with a computer, network traffic comprising one or more data packets within a network. Based on a detection of the network traffic comprising the one or more data packets within the network, the method might include capturing the one or more data packets to move the one or more data packets from the network to a storage of the computer. Next, the method might include determining one or more attributes associated with each captured data packet. Based on a determination of the one or more attributes, the method might additionally include storing each captured data packet according to the one or more first attributes in the storage of the computer.

25 Claims, 9 Drawing Sheets

(56) References Cited

U.S. PATENT DOCUMENTS

| | | | |
|---|---|---|---|
| 7,855,967 B1* | 12/2010 | Rangavajjhala | H04L 43/14 709/224 |
| 9,210,090 B1 | 12/2015 | Baldi et al. | |
| 9,978,451 B2* | 5/2018 | Pus | G11C 15/04 |
| 10,410,135 B2 | 9/2019 | Shumpert | |
| 10,652,281 B1* | 5/2020 | Moolenaar | H04L 63/0236 |
| 11,030,884 B1 | 6/2021 | Levy | |
| 11,494,189 B2* | 11/2022 | Crupnicoff | H04L 12/4633 |
| 2009/0168648 A1* | 7/2009 | Labovitz | H04L 43/0876 370/241 |
| 2011/0125749 A1 | 5/2011 | Wood et al. | |
| 2015/0347255 A1 | 12/2015 | Lippett et al. | |
| 2016/0019466 A1 | 1/2016 | Lightner et al. | |
| 2016/0248655 A1 | 8/2016 | Francisco et al. | |
| 2018/0278629 A1* | 9/2018 | McGrew | H04L 63/1416 |
| 2019/0213488 A1 | 7/2019 | Zou | |
| 2020/0044921 A1 | 2/2020 | Srinivas et al. | |
| 2020/0250477 A1 | 8/2020 | Barthur | |
| 2021/0037037 A1 | 2/2021 | Oliner et al. | |

OTHER PUBLICATIONS

Jan Kubalek. "High-speed DMA packet transfer in system DPDK", Excel@FIT 2018, 7 pages. (Year: 2018).*

International Search Report and Written Opinion, International Application No. PCT/US21/34574 dated Sep. 16, 2021, 10 pages.

International Search Report and Written Opinion, International Application No. PCT/US23/62739 dated May 30, 2023, 8 pages.

International Search Report and Written Opinion, International Application No. PCT/US23/62743 dated May 31, 2023, 8 pages.

Nadun Rajasinghe, 'INSecS: An Intelligent Network Security System', In: The University of Western Ontario, A thesis submitted in partial fulfillment of the requirements for the degree in Master of Engineering Science, Aug. 15, 2018, 93 pages.

Anand Ravindra Vishwakarma, 'Network Traffic Based Botnet Detection Using Machine Learning', In: San Jose State University, Master's Theses and Graduate Research, May 18, 2020, 67 pages.

International Preliminary Report on Patentability, International Application No. PCT/US21/34574 dated Dec. 8, 2022, 6 pages.

* cited by examiner

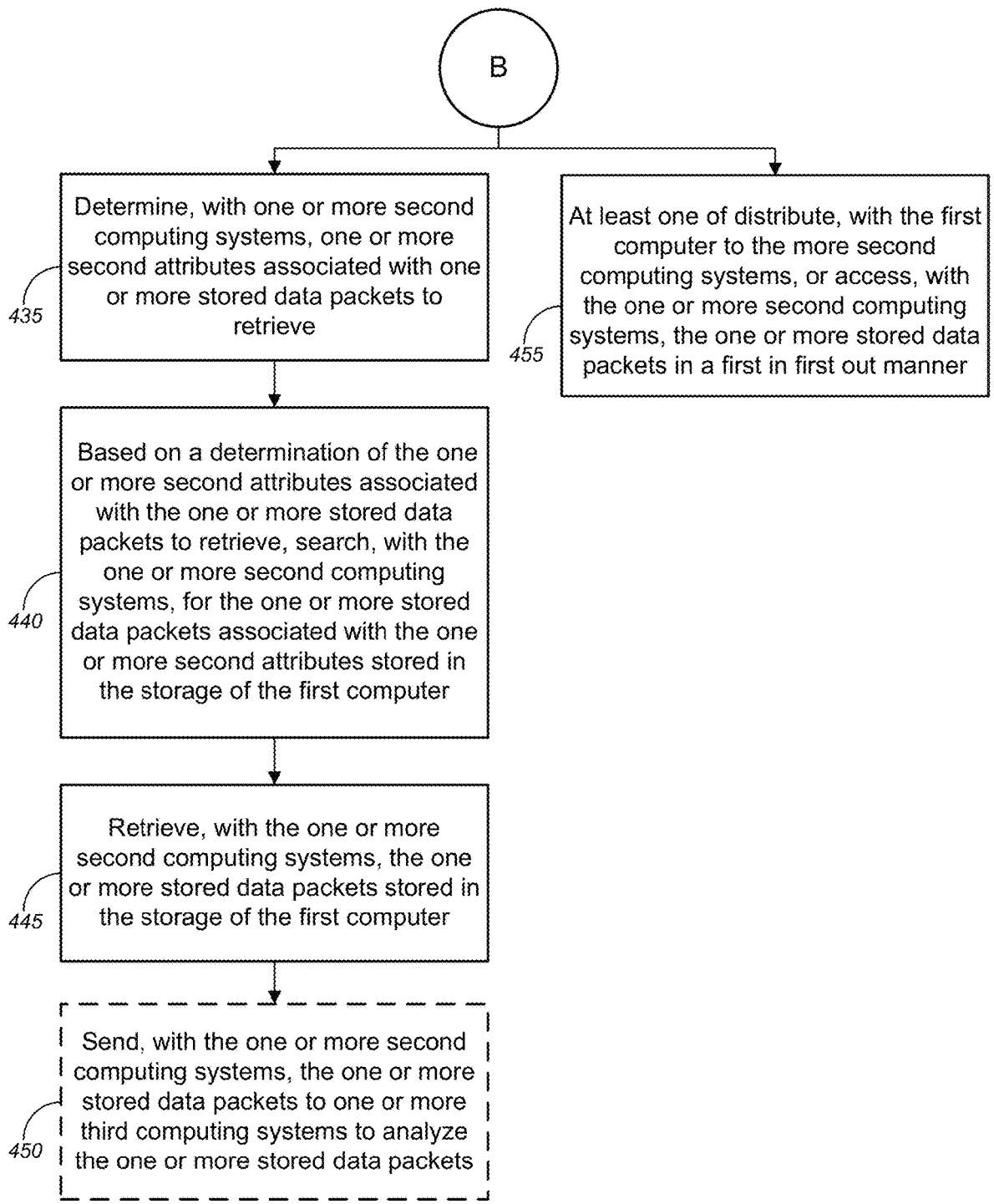

HIGH PERFORMANCE PACKET CAPTURE AND ANALYTICS ARCHITECTURE

CROSS-REFERENCES TO RELATED APPLICATIONS

This application claims priority to U.S. Patent Application Ser. No. 63/031,090 (the "'090 Application"), filed May 28, 2020 by Bo David Gustavsson, entitled, "High Performance Packet Capture and Analytics Architecture," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatus for implementing data packet processing, and, in particular embodiments, to methods, systems, and apparatuses for implementing data packet capture, data packet storage, data packet retrieval, and data packet distribution.

BACKGROUND

Traditionally, in order to ingest or capture network traffic comprising one or more data packets during periods of high network traffic, computing systems divide the network traffic into multiple different streams and direct each stream to multiple different computers, servers, or analytics systems to ingest or capture. The computing systems are unable to ingest or capture the entire stream of network traffic at one computing device. Further, in order to divide the data packets into multiple different streams, traditional computing systems use packet brokers or load balancers. The packet broker or load balancer is a specialized piece of equipment that is very expensive and increases the complexity of ingesting or capturing the data packets.

Additionally, when the packet broker or load balancer directs each stream to multiple different computers, servers, or analytics systems to ingest or capture, ingesting or capturing the data packets at these systems can be computationally intensive and require a lot of processing power. If the multiple different computers, servers, or analytics systems cannot ingest or capture the streams faster than the packet broker or load balancer sends them, then the data packets may be lost or dropped.

Hence, there is a need for more robust and scalable solutions for implementing data packet processing, and, in particular embodiments, to methods, systems, and apparatuses for implementing data packet capture, data packet storage, data packet retrieval, and data packet distribution.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4C are flow diagrams illustrating a method for implementing data packet capture, data packet storage, data packet retrieval, and data packet distribution, in accordance with various embodiments.

DETAILED DESCRIPTION OF CERTAIN EMBODIMENTS

Overview

Figure 1:
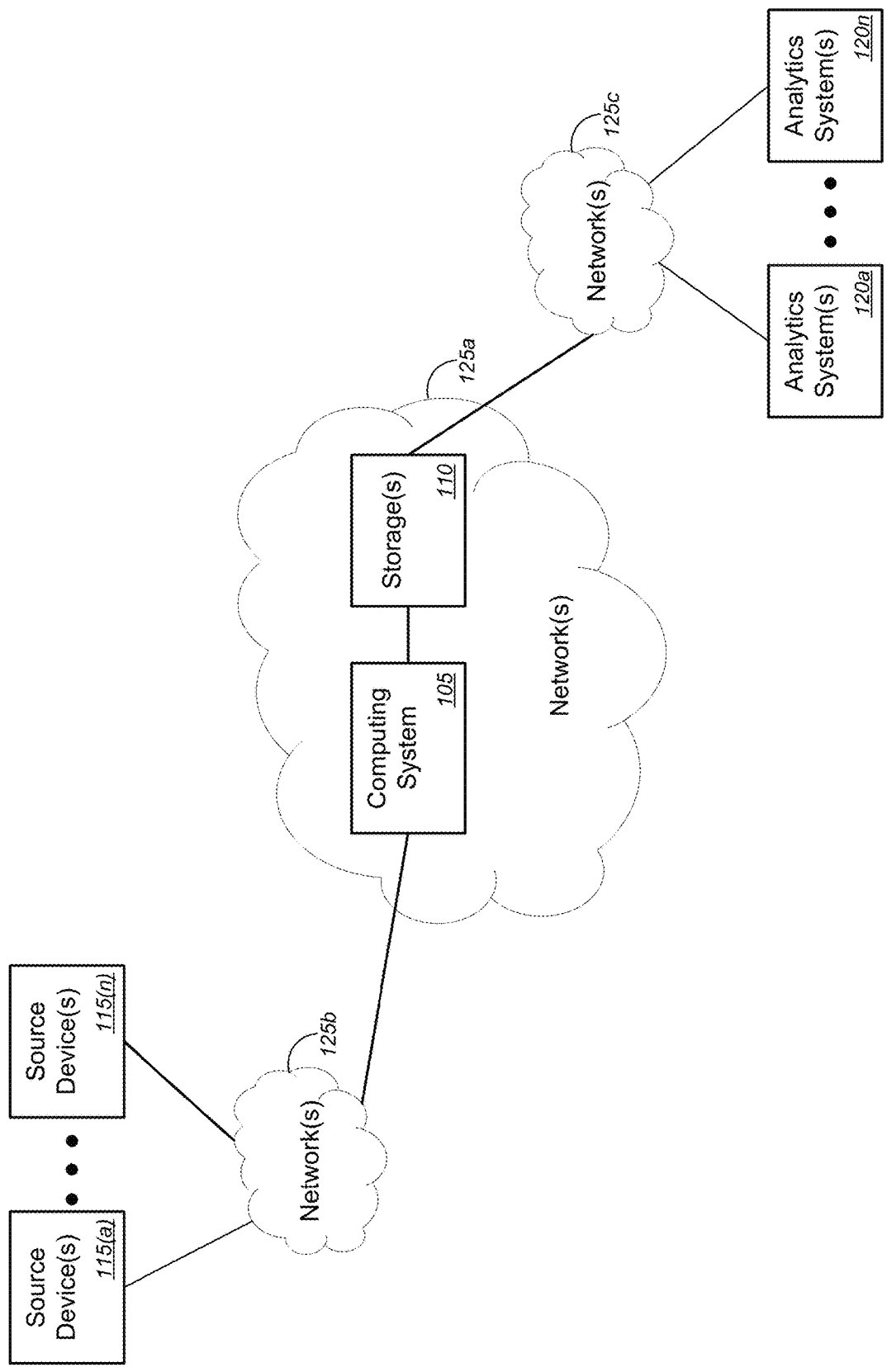
FIG. 1 is a schematic diagram illustrating a system for implementing data packet capture, data packet storage, data packet retrieval, and data packet distribution, in accordance with various embodiments.

Various embodiments provide tools and techniques for implementing data packet processing, and, in particular embodiments, to methods, systems, and apparatuses for implementing data packet capture, data packet storage, data packet retrieval, and data packet distribution.

In various embodiments, a method for performing data packet processing might include detecting, with a first computer, network traffic comprising one or more data packets within a network. Based on a detection of the network traffic comprising the one or more data packets within the network, the method might include capturing, with the first computer, the one or more data packets to move the one or more data packets from the network to a storage of the first computer. Next, the method might include determining, with the first computer, one or more first attributes associated with each captured data packet of the one or more data packets. Based on a determination of the one or more first attributes associated with each captured data packet of the one or more data packets, the method might additionally include indexing and storing, with the first computer, each captured data packet of the one or more data packets according to the one or more first attributes associated with each captured data packet in the storage of the first computer.

In some cases, the method might further include determining, with one or more second computing systems, one or more second attributes associated with one or more stored data packets to retrieve. Based on a determination of the one or more second attributes associated with the one or more stored data packets to retrieve, the method might comprise searching, with the one or more second computing systems, for the one or more stored data packets associated with the one or more second attributes stored in the storage of the first computer. Further, the method might include retrieving, with the one or more second computing systems, the one or more stored data packets stored in the storage of the first computer. The one or more second computing systems may then perform data analytics on the one or more stored data packets and/or send the one or more stored data packets to one or more third computing systems to perform data analytics on the one or more stored data packets.

Several advantages are realized by this method of performing data packet processing. In a non-limiting example, by creating the capability of storing network packet data on disk at network speeds of 100 Gbps or more, it is possible to eliminate dropped packets as part of network traffic analytics. Next, by capturing the one or more data packets and eliminating lost or dropped packets, companies can obtain more insight into Network Capacity Planning, Security Analytics, and Compliance.

Additionally, by storing one or more data packets on disk and in persistent storage, it is no longer necessary to design and size an analytics layer to keep up with the maximum network speed. Data packets may be stored and analytics systems can access and analyze the stored data packets at average network speeds and at their leisure.

Further, by simultaneously providing the capability to store and stream that data in a controlled manner to one or more analytics systems, this enables a separation of duties where a first computer/server can be dedicated to performing the function of ingesting, indexing, and writing to persistent storage one or more captured data packets, while other computers/servers can be dedicated to distributing and analyzing the data. Also, by simultaneously providing the capability to stream that data in a controlled manner to several analytics systems at once, it is possible to achieve significant simplifications and cost savings of the network traffic analytics architecture compared to traditional architectures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network technology, network provisioning technology, data packet capture technology, data packet analytic technology, and/or the like. In other aspects, certain embodiments, can improve the functioning of user equipment or systems themselves (e.g., network provisioning systems, network packet capture systems, data packet analytic systems, etc.), for example, by detecting, with a first computer, network traffic comprising one or more data packets within a network; based on a detection of the network traffic comprising the one or more data packets within the network, capturing, with the first computer, the one or more data packets to store the one or more data packets from the network to a storage of the first computer; determining, with the first computer, one or more first attributes associated with each captured data packet of the one or more data packets; based on a determination of the one or more first attributes associated with each captured data packet of the one or more data packets, indexing and storing, with the first computer, each captured data packet of the one or more data packets according to the one or more first attributes associated with each captured data packet in the storage of the first computer; and/or the like.

In particular, to the extent any abstract concepts are present in the various embodiments, those concepts can be implemented as described herein by devices, software, systems, and methods that involve specific novel functionality (e.g., steps or operations), such as, capturing, with the first computer, the one or more data packets to store the one or more data packets from the network to a storage of the first computer; determining, with the first computer, one or more first attributes associated with each captured data packet of the one or more data packets; based on a determination of the one or more first attributes associated with each captured data packet of the one or more data packets, indexing and storing, with the first computer, each captured data packet of the one or more data packets according to the one or more first attributes associated with each captured data packet in the storage of the first computer; simultaneously accessing the storage of the first computer by the first computer to store each captured data packet and the one or more second computing systems to retrieve the one or more captured data packets; and/or the like, to name a few examples, that extend beyond mere conventional computer processing operations. These functionalities can produce tangible results outside of the implementing computer system, including, merely by way of example, optimized data packet capture, elimination of data packet loss, simultaneous access of persistent storage, and/or the like, at least some of which may be observed or measured by users, customers, and/or service providers.

In an aspect, a method may include detecting, with a first computer, network traffic comprising one or more data packets within a network. Based on a detection of the network traffic comprising the one or more data packets within the network, the method might include capturing, with the first computer, the one or more data packets to move the one or more data packets from the network to a storage of the first computer. Next, the method might include determining, with the first computer, one or more first attributes associated with each captured data packet of the one or more data packets. Based on a determination of the one or more first attributes associated with each captured data packet of the one or more data packets, the method might additionally include indexing and storing, with the first computer, each captured data packet of the one or more data packets according to the one or more first attributes associated with each captured data packet in the storage of the first computer. The storage of the first computer may be configured to simultaneously store each captured data packet and distribute one or more stored data packets to at least one of the first computer or one or more second computing systems.

In some embodiments, the network traffic is flowing through the network at a network speed of 100 gigabits per second ("Gbps") or more. The first computer is able to capture the network traffic flow flowing through the network at the network speed of 100 Gbps or more and store the one or more data packets in the storage of the first computer. The first computer is further configured to capture the network traffic flowing through the network at the network speed of 100 Gbps or more and store the one or more data packets in the storage of the first computer without losing or dropping the one or more data packets.

According to some embodiments, the storage is a buffer in the network traffic flow. The first computer sends each data packet of the one or more data packets directly to the storage of the first computer, without a load balancer. In some instances, the storage is both a persistent storage for storing each captured data packet and a flow through buffer for distributing data to at least one of the first computer or the one or more second computers. In some cases, the persistent storage is spinning disk storage.

In some embodiments, the first computer comprises a network interface card and the network interface card detects the one or more data packets within the network and captures the one or more data packets. Additionally, the network interface card sends each data packet of the one or more data packets directly to the storage of the first computer, without a load balancer. Alternatively, the network interface card sends each captured data packet to compute memory and the first computer writes each captured data packet to the storage of the first computer after the network interface card sends each captured data packet to compute memory.

In some cases, the first computer comprises a network connection to receive packets from other devices in the network containing the first computer. The network connection may detect the one or more data packets within the network containing the first computer and capture the one or more data packets from the other devices in the network.

Merely by way of example, in some cases, the one or more first attributes associated with each captured data packet comprises, without limitation, at least one of a time stamp, an address field, an indication of an encrypted captured data packet or an unencrypted data packet, a length of each captured data packet, a protocol associated with each captured data packet, a tunneling protocol associated with each captured data packet, a virtual local area network associated with each captured data packet, a uniform resource identifier associated with each captured data packet, an indication of a method associated with capturing each captured data packet, a payload associated with each captured data packet, and/or the like. The time stamp may indicate a time each captured data packet was captured. The address field may be located in a header of each captured data packet and the address field may comprise, without limitation, at least one of an internet protocol ("IP") source address, an IP destination address, a port source address, a port destination address, and/or the like.

According to some embodiments, the method might further comprise grouping, with the first computer, two or more data packets of the one or more data packets into one or more first segments based on the one or more first attributes and storing, with the first computer, each captured data packet of the one or more data packets according to the one or more first segments associated with each captured data packet in the storage of the first computer. The first computer might compress the one or more first segments comprising the two or more data packets before writing the one or more first segments to the storage of the first computer.

In some embodiments, indexing and storing each captured data packet of the one or more data packets according to the one or more first attributes associated with each captured data packet in the storage of the first computer, further comprises at least one of indexing each captured data packet while simultaneously storing each captured data packet or indexing each captured data packet before storing each captured data packet. Alternatively, indexing and storing each captured data packet of the one or more data packets according to the one or more first attributes associated with each captured data packet in the storage of the first computer, further comprises indexing each captured data packet after each captured data packet has been stored.

According to some embodiments, the method may further comprise determining, with the one or more second computing systems, one or more second attributes associated with the one or more stored data packet to retrieve from the storage of the first computer. Based on a determination of the one or more second attributes associated with the one or more stored data packets to retrieve, the method might further comprise searching, with the one or more second computing systems, for the one or more stored data packets associated with the one or more second attributes stored in the storage of the first computer. Additionally, the method might include retrieving, with the one or more second computing systems, the one or more stored data packets stored in the storage of the first computer.

In some embodiments, the one or more second computing systems are different and remote from the first computer. Alternatively, the one or more second computing systems might include the first computer. Additionally, the storage of the first computer may be configured to be accessed by the first computer to store each captured data packet and the one or more second computing systems to retrieve the one or more stored data packets simultaneously. Further, the storage of the first computer may be configured to be accessed by two or more second computing systems to retrieve the one or more stored data packets simultaneously.

The method might further include sending, with the one or more second computing systems, the one or more stored data packets to one or more third computing systems to analyze the one or more stored data packets. The one or more second computing systems may send the one or more data packets to the one or more third computing systems in a flow-controlled manner. The one or more second computing systems may control the flow of the one or more stored data packets to prevent packet loss. The one or more second computers may be configured to control the flow of one or more data packet streams in such a way that the one or more second computing systems do not over send one or more data packets to the one or more third computing systems. This ensures that the one or more third computing systems do not drop the one or more data packets before the one or more data packets can be analyzed. The one or more third computing systems may then receive the one or more stored data packets and perform data analytics on the one or more stored data packets.

Alternatively, the one or more second computing systems may perform the one or more data analytics. In this scenario, the one or more second computing systems may access, retrieve, and analyze the one or more data packets from the storage of the first computer at the one or more second computing system's "leisure" in order to prevent packet loss. This flow control allows for the first computer to capture data packets at higher speeds than the one or more second computing systems access, retrieve, and analyze the one or more data packets.

Further, this flow control from the one or more second computing systems allows for the first computer to capture data packets at higher speeds than the one or more second computing systems and/or third computing systems access, receive, and/or analyze the one or more data packets.

In some cases, the method might further include at least one of distributing, with the first computer to the more second computing systems, or accessing, with the one or more second computing systems, the one or more stored data packets in a first in first out manner. In various instances, the storage of the first computer may be configured to distribute the one or more stored data packets to at least one of the first computer or the one or more second computing systems in real time by producing the one or more stored data packets immediately after the one or more stored data packets have been written to the storage of the first computer.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: detect network traffic comprising the one or more data packets within a network; based on a detection of the network traffic comprising the one or more data packets within the network, capture the one or more data packets to move the one or more data packets from the network to a storage of the apparatus; determine one or more first attributes associated with each captured data packet of the one or more data packets; and, based on a determination of the one or more first attributes associated with each captured data packet of the one or more data packets, index and store each captured data packet of the one or more data packets according to the one or more first attributes associated with each captured data packet in the storage of the apparatus. The storage of the apparatus may be configured to simultaneously store each captured data packet and distribute one or more stored data packets to at least one of the apparatus or one or more second computing systems.

In yet another aspect, a system might comprise a first computer, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first computer to: detect network traffic comprising the one or more data packets within a network; based on a detection of the network traffic comprising the one or more data packets within the network, capture the one or more data packets to move the one or more data packets from the network to a storage of the first computer; determine one or more first attributes associated with each captured data packet of the one or more data packets; and, based on a determination of the one or more first attributes associated with each captured data packet of the one or more data packets, index and store each captured data packet of the one or more data packets according to the one or more first attributes associated with each captured data packet in the storage of the first computer. The storage of the first computer may be configured to simultaneously store each captured data packet and distribute one or more stored data packets to at least one of the first computer or one or more second computing systems.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing data packet processing, and, in particular embodiments, to methods, systems, and apparatuses for implementing data packet capture, data packet storage, data packet retrieval, and data packet distribution, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing data packet capture, data packet storage, data packet retrieval, and data packet distribution, in accordance with various embodiments.

In the non-limiting embodiment of FIG. 1, system 100 may comprise a first computing system or a first computer 105 and corresponding one or more storages 110. System 100 may further include one or more source devices 115a-115n (collectively, source devices 115), one or more analytics systems or second computers 120a-120n (collectively, analytics systems 120), and one or more networks 125a, 125b, and 125c (collectively, "networks 125" or the like).

In various embodiments, the first computing system 105 may include hardware, software, or a combination of hardware and software, both physical and/or virtualized. For example, in some embodiments, the first computing system 105 may refer to a software agent or probe which may be deployed. For example, in some embodiments, the first computing system 105 may be deployed on a centralized server, controller, or other computer system. Accordingly, the first computing system 105 may be implemented on, without limitation, one or more service provider computers, one or more service provider devices, one or more user computers, one or more user devices, one or more consumer grade equipment, programmable logic controllers, single board computers, field programmable gate arrays ("FPGA"), application specific integrated circuits ("ASIC"), or a system on a chip ("SoC"), and/or the like. A service provider computer, a service provider device, a user computer, a user device, and/or a consumer grade equipment can be a general purpose computer (including, merely by way of example, a desktop computer, a tablet computer, a laptop computer, a handheld computer, and/or the like), a computing device (e.g., a residential gateway, a business gateway, a virtual gateway, and/or the like), cloud computing devices, a server (s), and/or a workstation computer(s), etc.

In some instances, the first computing system 105 may be disposed in and/or located at an edge of network 125a and capture one or more data packets or network traffic as the one or more data packets or network traffic enters network 125a. Additionally and/or alternatively, the first computing system 105 may capture one or more data packets or network traffic sent between one or more devices located within network 125a.

In some embodiments, the one or more storages 110 are contained within the first computing system 105. Additionally or alternatively, the one or more storages 110 may be separate from first computing system 105, but located within the same network 125a as first computing system 105. The one or more storages 110 may be communicatively coupled to (e.g., via a wired connection and/or wireless connection) to the first computing system 105. The one or more storages 110 can include, without limitation, a disk drive, a drive array, an optical storage device, a hard drive, a solid-state storage device such as non-volatile random-access memory ("NVRAM") and/or a read-only memory ("ROM"), which can be programmable, flash-updateable, and/or the like. The one or more storages 110 may be configured to implement any appropriate data stores, including, without limitation, various file systems, database structures, and/or the like. The one or more storages 110 may be persistent storages that continue to store data even when the first computer and/or the one or more storages 110 are turned off. The one or more storages 110 may be both a persistent storage configured to store one or more data packets and a flow through buffer configured to distribute the one or more data packets to first computing system 105 and/or the one or more analytics systems 120. In this case, "distribute" means either (1) that the first computing system 105 and/or storage 110 may distribute the one or more data packets to the first computing system 105 and/or analytics systems 120 from storage 110 and/or (2) that the first computing system 105 and/or one or more analytics systems 120 may be capable of accessing the storage 110 to retrieve the one or more data packets from storage 110.

The first computing system 105 and the one or more storages 110 may be located in one or more service provider networks, one or more access networks, one or more local area networks, and/or the like. The first computing system 105 and the one or more storages 110 may associated with one or more service providers, one or more users, one or more customers, one or more businesses, and/or the like.

In some cases, the one or more source devices 115 might include, without limitation, at least one of one or more service provider computers, one or more service provider devices, one or more user computers, one or more user devices, one or more consumer grade equipment, and/or the like. A service provider computer, a service provider device, a user computer, a user device, and/or a consumer grade equipment can be a general purpose computer (including, merely by way of example, a desktop computer, a tablet computer, a laptop computer, a handheld computer, and/or the like), a computing device (e.g., a residential gateway, a business gateway, a virtual gateway, a game console, a mobile device, a personal digital assistant, a smart watch, and/or the like), cloud computing devices, a server(s), and/or a workstation computer(s), etc.

In various embodiments, the one or more source devices 115 represent a source of network traffic and/or one or more data packets. In some cases, the one or more source devices 115 may be located within the same network (e.g., network 125a) as the first computing system 105 and/or in a different network (e.g., network 125b) from the first computing system 105. The one or more source devices 115 may be located in one or more service provider networks, one or more access networks, one or more local area networks, and/or the like. The one or more source devices 115 may associated with one or more service providers, one or more users, one or more customers, one or more businesses, and/or the like.

In some cases, the one or more analytics systems 120 might include, without limitation, hardware, software, or a combination of hardware and software, both physical and/or virtualized. For example, in some embodiments, the one or more first computing systems 105 may refer to a software agent or probe which may be deployed in either a centralized or distributed configuration. For example, in some embodiments, the one or more analytics systems 120 may be deployed on a centralized server, controller, or other computer system. In other embodiments, the one or more analytics systems 120 may be deployed in a distributed manner, across one or more network nodes or one or more computer systems, such as servers, controllers, orchestrators, or other types of network elements, and/or the like. Accordingly, the one or more analytics systems 120 may be implemented on, without limitation, one or more desktop computer systems, server computers, dedicated custom hardware appliances, programmable logic controllers, single board computers, field programmable gate arrays ("FPGA"), application specific integrated circuits ("ASIC"), or a system on a chip ("SoC"), and/or the like.

Additionally and/or alternatively, the one or more analytics systems 120 might include, without limitation, at least one of one or more service provider computers, one or more service provider devices, one or more user computers, one or more user devices, one or more consumer grade equipment, and/or the like. A service provider computer, a service provider device, a user computer, a user device, and/or a consumer grade equipment can be a general purpose computer (including, merely by way of example, a desktop computer, a tablet computer, a laptop computer, a handheld computer, and/or the like), a computing device (e.g., a residential gateway, a business gateway, a virtual gateway, and/or the like), cloud computing devices, a server(s), and/or a workstation computer(s), etc.

In some cases, the one or more analytics systems may be configured to analyze one or more data packets. The analytics may include network capacity planning and analytics, security analytics, compliance analytics, and/or the like.

In various embodiments, the one or more analytics systems 120 may include first computing system 105 and/or be different from first computing system 105. In some instances, the one or more analytics systems 120 may be located within the same network (e.g., network 125a) as the first computing system 105, in the same network (e.g., network 125b) as the one or more source devices 115, and/or in a different network (e.g., network 125c) from the first computing system 105 and the one or more source devices 115. The one or more analytics systems 120 may be located in one or more service provider networks, one or more access networks, one or more local area networks, and/or the like. The one or more analytics systems 120 may associated with one or more service providers, one or more users, one or more customers, one or more businesses, and/or the like.

According to some embodiments, networks 125a-125c may be the same network or different networks. Network(s) 125 may each include, without limitation, one of a service provider network, a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In various embodiments, the network(s) 125 may each include an access network of the service provider (e.g., an Internet service provider ("ISP")). In other embodiments, the network(s) 125 may each include a core network of the service provider and/or the Internet.

In various instances, the first computing system 105, the storage 110, the one or more source devices 115, and/or the one or more analytics systems 120 might be located and communicatively coupled together in a service provider network (e.g., networks 125a, 125b, 125c, or the like). Additionally and/or alternatively, the first computing system 105, the storage 110, the one or more source devices 115, and/or the one or more analytics systems 120 might be communicatively coupled with the together via one or more access networks (e.g., networks 125a, 125b, 125c, or the like). In some embodiments, the first computing system 105, the storage 110, the one or more source devices 115, and/or the one or more analytics systems 120 might be communicatively coupled with the together via a combination of one or more service provider networks and/or one or more access networks (e.g., networks 125a, 125b, 125c, or the like).

In some cases, the first computing system 105, the one or more storages 110, the one or more source devices 115, and/or the one or more analytics systems 120 may be located at one or more locations, which may include, without limitation, at least one of a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, a hospital or other medical facility, a research facility, a university (or other post-secondary) building or buildings within a campus, and/or the like.

In operation, the first computing system 105 might perform data packet processing by detecting network traffic comprising one or more data packets within a network 125a. The first computing system 105 may detect that the network traffic from the one or more source devices 115 is either entering network 125a or moving within network 125a. The one or more source devices 115 may be located within network 125a or located in a different network 125b.

In some cases, the network traffic may be flowing through the network 125a containing the first computer at an average network speed of 40 gigabytes per second ("Gbps") or less. In various instances, the network traffic may be flowing through the network 125a containing the first computer at 40 Gbps or more. In some embodiments, the network traffic may be flowing through the network 125a containing the first computer at 100 Gbps or more.

The first computing system 105 may act as a single point of ingest for network traffic entering or flowing within network 125a. In other words, the network traffic that the first computing system 105 receives from network 125a has not previously been divided by a load balancer before being received by first computing system 105 and instead first computing system 105 is ingesting the entire undivided network traffic stream. In some cases, the first computing system 105 is located at an edge of network 125a and captures one or more data packets or network traffic as the one or more data packets or network traffic enters network 125a. Additionally, the first computing system 105 might include a network connection to receive packets from other collection software located in the network 125a. The network connection may detect the one or more data packets within the network 125a and collect the one or more data packets from the other collection software in the network 125a. In this way, first computing system 105 acts as the single point of ingest for network traffic entering or flowing within network 125a.

Based on a detection of network traffic comprising the one or more data packets within network 125a, the first computing system 105 might then capture the one or more data packets to move the one or more data packets from the network 125a to one or more storages 110 of the first computing system 105 and/or located locally within network 125a. After capturing the one or more data packets, the first computing system 105 might store the one or more captured data packets in the one or more storages 110. The one or more stored data packets may include both data packets entering network 125a from another network (e.g., network 125b and/or 125c) and data packets flowing between one or more devices located within network 125a.

The one or more storages 110 of the first computing system 105 and/or network 125a may act as a buffer in the network traffic flow. The first computing system 105 sends each data packet of the one or more data packets directly to the one or more storages 110 of the first computing system 105 and/or network 125a without dividing the network traffic via a load balancer. In other words, the network traffic that the one or more storages 110 receive has not previously been divided by a load balancer before being received by the one or more storages 110 and instead the one or more storages 110 are ingesting and/or storing the entire undivided network traffic stream.

In various cases, the one or more storages 110 of the first computing system 105 may be capable of capturing and storing the one or more data packets at 20 Gbps sustained for 3.5 days. In other words, the network traffic flow may be flowing through the network at a network speed of 20 Gbps and the first computing system 105 may be able to capture the network traffic flow flowing through the network at the network speed of 20 Gbps and store the one or more data packets in the one or more storages 110 of the first computing system 105 for at least 3.5 days. Because the first computing system 105 is storing the one or more data packets within the one or more storages 110, the one or more data packets may be captured and stored without losing or dropping the one or more data packets.

In some embodiments, the one or more storages 110 of the first computing system 105 may be capable of capturing and storing the one or more data packets at 100 Gbps or more sustained for 24 hours or more. In other words, the network traffic flow may be flowing through the network at a network speed of 100 gigabits per second or more and the first computing system 105 may be able to capture the network traffic flow flowing through the network at the network speed of 100 gigabits per second and store the one or more data packets in the one or more storages 110 of the first computing system 105 for at least 24 hours. Because the first computing system 105 is storing the one or more data packets within the one or more storages 110, the one or more data packets may be captured and stored without losing or dropping the one or more data packets.

Additionally, in some cases, the first computing system 105 might determine one or more first attributes associated with each captured data packet of the one or more data packets. The one or more first attributes associated with each captured data packet might include, without limitation, at least one of a time stamp, an address field, an indication of an encrypted captured data packet or an unencrypted data packet, a length of each captured data packet, a protocol associated with each captured data packet, a tunneling protocol associated with each captured data packet, a virtual local area network associated with each captured data packet, a uniform resource identifier associated with each captured data packet, an indication of a method associated with capturing each captured data packet, a payload associated with each captured data packet, and/or the like. The time stamp may indicate a time each captured data packet was captured or stored. The time each captured data packet was captured or stored may be recorded to the nanosecond. The address field may be located in a header of each captured data packet and the address field may comprise at least one of an internet protocol ("IP") source address, an IP destination address, a port source address, a port destination address, and/or the like.

In some cases, the determination of the one or more first attributes associated with each captured data packet might occur before the one or more captured data packets are stored, as the one or more captured data packets are stored, or after the one or more data packets are stored. In a non-limiting example, attributes that may be determined quickly (e.g., timestamp, address field, etc.) may be associated with each captured data packet before or as the one or more captured data packets are stored. Additionally and/or alternatively, attributes that take more time to be determined (e.g., encrypted data packets, packet length, etc.) may be determined after the one or more data packets are stored.

In some cases, if the first computing system 105 is experiencing low network traffic speeds and/or low amounts of network traffic, then the determination of all of the one or more first attributes associated with each captured data packet might occur before or as the one or more captured data packets are stored. Alternatively, if the first computing system 105 is experiencing high network traffic speeds and/or high amounts of network traffic, then the determination of the one or more first attributes associated with each captured data packet might occur both before and/or as the one or more captured data packets are stored and after the one or more data packets are stored. In a non-limiting example, each captured data packet may first be stored based on a timestamp and then, after each data packet is stored, each captured data packet may be associated with one or more other attributes. In some cases, the first computing system 105 may determine the one or more other attributes after the one or more data packets are stored. Alternatively, the one or more analytics systems 120 may determine the one or more other attributes after the one or more data packets are stored.

The first computing system 105 may index and store each captured data packet of the one or more data packets according to the one or more first attributes associated with each captured data packet in the storage 110 of the first computing system 105. Similar to the determination of the one or more attributes, the indexing of each captured data packet according to the one or more first attributes might occur before the one or more captured data packets are stored, as the one or more captured data packets are stored, and/or after the one or more data packets are stored. In a non-limiting example, indexing the one or more captured data packets according to attributes that may be determined quickly may occur before or as the one or more captured data packets are being stored. Additionally and/or alternatively, indexing according to attributes that take more time to be determined may cause the one or more stored data packets to be reindexed according to the one or more attributes and/or associated with additional attributes after the one or more data packets are stored.

Additionally and/or alternatively, the first computing system 105 may group the one or more data packets into one or more first segments, one or more first conversations, and/or one or more first data packet streams based on the one or more first attributes and store each captured data packet according to the one or more first segments, one or more first conversations, or one or more first data packet streams associated with each captured data packet in the storage 110 of the first computing system 105.

Each first segment, first conversation, or first data packet stream may include two or more data packets sharing one or more attributes. In a non-limiting example, each first segment or conversation may be associated with captured data packets received by the first computing system 105 within a specific time period and/or containing the same source address and/or destination address, and/or the like. Each captured data packet meeting the requirements for the first segment, first conversation, or first data packet stream may be stored and/or indexed together. In some cases, each first segment or conversation may be compressed before writing the one or more first segments to the storage of the first computer.

The one or more storages 110 of the first computing system 105 might be configured to both store the one or more data packets and to distribute the one or more data packets to at least one of the first computing system 105 or the one or more analytics system 120 after the one or more data packets have been stored to the storage 110 of the first computing system 105. In this way, the one or more storages 110 are both a persistent storage for storing captured data packets and flow through buffers for the one or more captured data packets to be streamed to other consumers of the captured data packets via a data distribution layer.

The one or more storages 110 may also be configured to allow the one or more analytics systems 120 to retrieve the one or more captured data packets from the one or more storages 110 in real-time. In order to achieve this, the one or more storages 110 have the capability that as soon as the one or more data packets are written to the one or more storages 110, the one or more captured data packets are produced and are capable of being read by the one or more analytics systems 120 and/or first computing system 105.

According to some embodiments, the first computing system 105, the one or more storages 110, and/or the one or more analytics systems 120 might determine one or more stored data packets to retrieve, distribute, and/or access from the one or more storages 110. In some cases, the first computing system 105, the one or more storages 110, and/or the one or more analytics systems 120 may retrieve captured data packets in a first in first out ("FIFO") manner. In other words, the first data packet stored in the one or more storages 110 may be retrieved, distributed, or accessed by the first computing system 105, the one or more storages 110, and/or the analytics systems 120 before retrieving other data packets. A determination of which data packets were captured first and/or stored first may be based on a time stamp associated with a time each data packet was captured or stored.

Alternatively, in some cases, the first computing system 105, the one or more storages 110, and/or the one or more analytics systems 120 might determine one or more stored data packets to retrieve, distribute, and/or access from the one or more storages 110 based on one or more second attributes and/or one or more second segments one or more second conversations, or one or more second data capture streams associated with the one or more second attributes. Each first computing system 105 and/or each analytics system 120 may be responsible for analyzing a different second segment or second conversation.

The one or more second attributes associated with each stored data packet might include, without limitation, at least one of a time stamp, an address field, an indication of an encrypted captured data packet or an unencrypted data packet, a length of each captured data packet, a protocol associated with each captured data packet, a tunneling protocol associated with each captured data packet, a virtual local area network associated with each captured data packet, a uniform resource identifier associated with each captured data packet, an indication of a method associated with capturing each captured data packet, a payload associated with each captured data packet, and/or the like. The time stamp may indicate a time each captured data packet was captured or stored. The time each captured data packet was captured or stored may be recorded to the nanosecond. The address field may be located in a header of each captured data packet and the address field may comprise at least one of an internet protocol ("IP") source address, an IP destination address, a port source address, a port destination address, and/or the like.

In order to determine which stored data packets to retrieve, distribute, or access, the first computing system 105 and/or the one or more analytics systems 120 may receive input from an operator indicating attributes, segments, conversations, or streams associated with data packets to retrieve, distribute, or access. Alternatively, the first computing system 105 and/or the analytics system 120 may automatically determine attributes, segments, conversations, or streams associated with data packets to retrieve, distribute, or access.

Based on a determination of the one or more second attributes associated with the one or more stored data packets to retrieve, the first computing system 105 may distribute the one or more stored data packets associated with the one or more second attributes to the one or more analytics systems 120. Alternatively, the one or more analytics systems 120 may send a request to the first computing system 105 and/or storage 110 requesting the one or more stored data packets associated with the one or more second attributes. The first computing system 105 and/or the one or more storages 110 may then send the one or more stored data packets associated with the one or more second attributes to the one or more analytics systems 120. Alternatively, the one or more analytics systems 120 may have access to the one or more storages 110 and retrieve the one or more stored data packets associated with the one or more second attributes from the one or more storages 110. In some cases, the one or more analytics systems 120 may have access to the storage 110 via a virtualized environment.

In a non-limiting example, the first computing system 105 may distribute and/or the one or more analytics systems 120 may retrieve or ask the first computing system 105 to retrieve stored data packets matching the attribute, segment, and/or conversation provided by the analytics system 120. Based on the attribute, segment, and/or conversation provided by the analytics system 120, the analytics system 120 and/or first computing system 105 may pull all packets matching the provided attribute, segment, and/or conversation. This enables efficient searching and retrieval by the first computing system 105 and/or analytics system 120 to distribute or pull data of interest to the first computing system 105 and/or analytics system 120.

Additionally, the one or more storages 110 of the first computing system 105 may be configured to be simultaneously accessed by the first computing system 105 to store each captured data packet and the first computing system 105 and/or the one or more analytics systems 120 to retrieve the one or more stored data packets. Further, the one or more storages 110 of the first computing system 105 may be configured to be accessed by two or more analytics systems 120 to retrieve the one or more stored data packets simultaneously. By enabling more than one device to access the one or more storages 110 at a time, a separation of duties between the first computing system 105 and the one or more analytics systems 120 and/or between different software programs on the first computing system 105 may be realized where the first computing system 105 and/or a first software program on the first computing system 105 can be dedicated to perform the functions of ingesting, indexing, and writing to the one or more storages 110 the one or more captured data packets, while the one or more analytics systems 120 and/or a second software program on the first computing system 105 can be dedicated to perform the functions of retrieving, analyzing, and distributing the one or more captured data packets.

In various instances, the one or more storages 110 may store the one or more captured data packets until the one or more captured data packets are distributed by first computing system 105 and/or retrieved by the one or more analytics systems 120. Additionally and/or alternatively, the one or more storages 110 may store the one or more captured data packets for a predetermined amount of time (e.g., one or more minutes, one or more hours, one or more days, one or more weeks, and/or the like).

In some cases, the first computing system 105 and/or the one or more storages 110 may determine that one or more data packets have not been distributed by the first computing system 105 or retrieved by the one or more analytics systems 120 after a predetermined amount of time (e.g., one or more minutes, one or more hours, one or more days, one or more weeks, and/or the like). Based on a determination that one or more data packets have not been distributed by the first computing system 105 or retrieved by the one or more analytics systems 120 after a predetermined amount of time, the first computing system 105 and/or the one or more storages 110 may push the unretrieved data packets to the one or more analytics systems 120.

In some cases, the first computing system 105 and/or the one or more storages 110 may further determine whether the network 125b comprising the one or more analytics system 120 is experiencing below average or average network traffic. Based on a determination that one or more data packets have not been retrieved by the one or more analytics systems 120 after a predetermined amount of time and that the network 125b comprising the one or more analytics system 120 is experiencing below average or average network traffic, the first computing system 105 and/or the one or more storages 110 may push the unretrieved data packets to the one or more analytics systems 120. This ensures that no data packets are lost before they are analyzed or distributed by the one or more analytics systems 120. Alternatively, based on a determination that one or more data packets have not been distributed by the first computing system 105 or retrieved by the one or more analytics systems 120 after a predetermined amount of time, the first computing system 105 and/or the one or more storages 110 may determine that the one or more data packets stored for the predetermined amount of time are not of interest to the one or more analytics systems 120 and may delete the one or more stored data packets from storage 110.

Once the one or more data packets have been received by the one or more analytics systems 120, the one or more analytics systems 120 may analyze one or more data packets. Additionally and/or alternatively, the one or more analytics systems 120 may send the one or more data packets to one or more other devices to analyze the one or more data packets. The analytics may include network capacity planning and analytics, security analytics, compliance analytics, and/or the like.

These and other functions of the system 100 (and its components) are described in greater detail below with respect to FIGS. 2-4.

Figure 2:
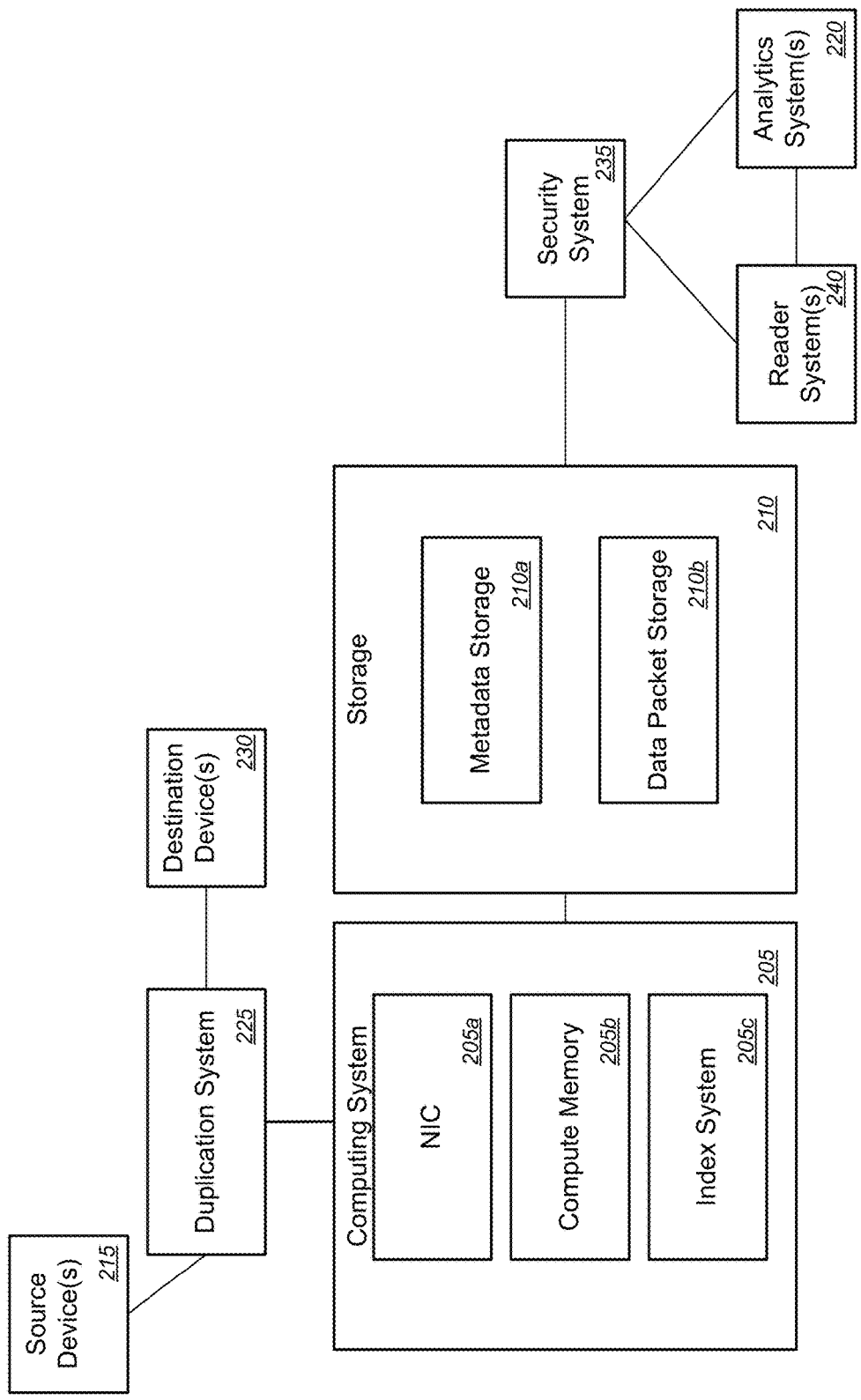
FIG. 2 is a schematic diagram illustrating another system for implementing data packet capture, data packet storage, data packet retrieval, and data packet distribution, in accordance with various embodiments.

FIG. 2 is a schematic diagram illustrating another system 200 for implementing data packet capture, data packet storage, data packet retrieval, and data packet distribution, in accordance with various embodiments. FIG. 2 is intended to provide a different perspective with respect to the system 100 of FIG. 1 and may be applicable to some of the functionalities described above with respect to FIG. 1, or the like. FIG. 2 is only one example of how to implement data packet capture, data packet storage, data packet retrieval, and data packet distribution.

In the non-limiting embodiment of FIG. 2, system 200 might comprise one or more first computing systems 205 (which may correspond to one or more first computing systems 105 of FIG. 1, or the like), a corresponding storage 210 (which may correspond to the one or more storages 110 of FIG. 1, or the like), one or more source devices 215 (which may correspond to one or more source devices 115 of FIG. 1, or the like), one or more analytics systems 220 (which may correspond to one or more analytics systems 120 of FIG. 1, or the like), and one or more networks (not shown). System 200 may further include one or more duplication systems 225, one or more destination devices 230, one or more security systems or security layers 235, and one or more reader systems 240. The one or more reader systems 240 may be similar to the one or more analytics systems 120 described in FIG. 1 except that the one or more reader systems 240 only retrieve, access, or receive one or more data packets and do not perform analytics on the one or more data packets.

In some embodiments, first computing system 205 may include corresponding storage 210, one or more duplication systems 225, one or more security systems 235, and/or one or more reader systems 240. Additionally and/or alternatively, first computing system 205 may be communicatively coupled to storage 210, one or more duplication systems 225, and one or more security systems 235.

In operation, source devices 215 may be a source of network traffic and transmit network traffic toward or within a network containing first computing system 205. The transmitted network traffic transmitted from the one or more source devices 215 may be received by one or more duplication systems 225. The duplication systems 225 may include, without limitation, a test access point ("TAP"), a switch port analyzer ("SPAN"), and/or the like. The duplication systems 225 may duplicate the one or more data packets. Once the one or more data packets have been duplicated, the duplication system 225 may send the one or more data packets on to one or more destination devices 230 and a copy of the one or more data packets to first computing system 205 and/or network interface card ("NIC") 205a. The one or more destination devices 230 may be a destination for network traffic.

The first computing system 205 may comprise NIC 205a. Alternatively, NIC 205a may be separate from, but communicatively coupled to first computing system 205. The NIC 205a may listen to the network traffic in a network containing the first computing system 105 and move the duplicated one or more data packets from the network to compute memory 205b and/or storage 210. Compute memory 205b may be a temporary storage (e.g., random access memory ("RAM") device) while storage 210 may be persistent or permanent storage (e.g., a disk drive, a drive array, an optical storage device, a hard drive, a solid-state storage device, etc.). The NIC 205a of first computing system 205 may send each captured data packet of the one or more data packets directly to compute memory 205b and/or the storage 110 of the first computing system 205 without a load balancer. In other words, the network traffic that the compute memory 205b and/or storage 210 receives from the NIC 205a has not previously been divided by a load balancer before being received by the compute memory 205b and/or storage 210 and instead the compute memory 205b and/or storage 210 is ingesting and/or storing the entire undivided network traffic stream. In some cases, the NIC 205a may send one or more segments or conversations comprising two or more data packets to the compute memory 205b and/or storage 210 instead of sending each data packet individually.

In some instances, the NIC 205a sends the duplicated one or more data packets from the network to compute memory 205b. In some cases, the compute memory 205b may be part of one or more software programs and/or indexing systems 205c. Next, the first computing system 205 may access the one or more data packets in compute memory 205b and the index the one or more data packets using the one or more software programs and/or indexing systems 205c. After the one or more data packets have been indexed, the one or more software programs and/or indexing systems 205c may send the one or more data packets to storage 210. Alternatively, the NIC 205a may send the one or more data packets directly to storage 210.

In some embodiments, the indexing system 205c might determine one or more first attributes associated with each captured data packet of the one or more data packets. The first computing system 205 and indexing system 205c may index and store each captured data packet of the one or more data packets according to the one or more first attributes associated with each captured data packet in the storage 210 of the first computing system 205.

In some embodiments, the determination of the one or more first attributes associated with each captured data packet might occur before the one or more captured data packets are stored, as the one or more captured data packets are being stored, or after the one or more data packets are stored. In a non-limiting example, if the first computing system 205 and/or indexing system 205c determines that a network is experiencing high network traffic (e.g., 40 Gbps or more), the first computing system 205 and/or indexing system 205c may decide to wait until after the one or more data packets are stored to determine one or more first attributes associated with each captured data packet. These one or more captured data packets that have not been associated with one or more attributes may instead be associated with a tag indicating that they still need to be associated with one or more attributes and/or with one or more attributes that can be quickly determined (e.g., a timestamp). After the first computing system 205 and/or indexing system 205c determines that network traffic has decreased, the first computing system 205 and/or indexing system 205c may then determine the one or more first attributes associated with each captured data packet, and each captured data packet may then be indexed and stored according to its associated attributes.

Alternatively, if the first computing system 205 and/or indexing system 205c determines that a network is experiencing average or low network traffic (e.g., 40 Gbps or less), the first computing system 205 and/or indexing system 205c might determine one or more first attributes associated with each captured data packet of the one or more data packets before or as each captured data packet is stored. The first computing system 205 and/or indexing system 205c may then index and store each captured data packet according to its associated attributes.

The storage 210 might include a metadata storage 210a and a data packet storage 210b. The metadata storage 210a might store metadata associated with each captured data packet. For example, the metadata storage 210a may store data representing indexing information for each data packet and/or file system structures for each data packet, and/or the like. The one or more analytics systems 220 may access the metadata storage to determine how to retrieve the one or more stored data packets. The data packet storage 210b might store each captured data packet. Although shown as two separate storages within storage 210, the metadata storage 210a and the data packet storage 210b may be part of the same storage or be different storages.

According to some embodiments, the one or more analytics systems 220 and/or reader systems 240 might determine one or more stored data packets and/or metadata associated with the one or more stored data packets to retrieve from storage 210. In some cases, the one or more analytics systems 220 retrieve the one or more data packets from the storage of the first computer at the "leisure" of the one or more analytics systems. In other words, the one or more analytics systems 220 retrieve the one or more stored data packets depending on the computing capacity associated with each of the one or more analytics systems 220 and/or network speed at which each of the one or more analytics systems 220 can receive data packets. Each analytics system 220 may retrieve the one or more data packets at different speeds depending on the computing capacity associated with each of the one or more analytics systems 220 and/or network speed at which each of the one or more analytics systems 220. In this way, no data packets are lost before they have been analyzed.

In other cases, the one or more reader systems 240 may be incorporated into the first computing system 205, the one or more analytics systems 220, and/or be a separate device from the first computing system 205 and/or the one or more analytics systems 220. The one or more reader systems 240 may be configured to read and retrieve the one or more data packets stored in storage 210. The one or more reader systems 240 may then send or distribute the one or more data packets to the one or more analytics systems 220 to perform data analytics.

In some instances, the one or more reader systems 240 know the computing capacity of the each of the one or more analytics systems 220 and/or network speed at which each of the one or more analytics systems 220 can receive the one or more data packets. In this way, the one or more reader systems 240 may be configured to control the flow of one or more data packet streams in such a way that the one or more reader systems 240 do not over send one or more data packets to each of the one or more analytics systems 220. In various instances, the one or more readers 240 may send the one or more data packets at different speeds to each of the one or more analytics systems 220 depending on the computing capacity associated with each of the one or more analytics systems 220 and/or network speed at which each of the one or more analytics systems 220.

The flow control of the one or more readers 240 ensures that the one or more analytics systems 220 do not drop the one or more data packets before the one or more data packets can be analyzed. Further, this flow control from the one or more reader systems 240 allows for the system 200 to capture data packets at higher speeds than the one or more analytics systems 220 receive and analyze the one or more data packets.

The determination of the one or more stored data packets to retrieve may be made based on one or more second attributes associated with the one or more stored data packets. In order to determine which stored data packets to retrieve, the one or more analytics systems 220 may receive input from an operator indicating data packets to retrieve and/or attributes associated with data packets to retrieve. Alternatively, the analytics system 220 may automatically determine which data packets to retrieve and/or indicate attributes associated with data packets to retrieve.

In some cases, the one or more analytics systems 220 and/or reader system 240 may be configured to directly access the storage 210. A security system or security layer 235 may be incorporated into storage 210, first computing system 205, one or more reader systems 240, and/or a separate device. The security system 235 may determine whether the one or more analytics systems 220 and/or one or more reader systems 240 are authorized to access the storage 210 to retrieve one or more data packets. If the security system 235 determines that the one or more analytics systems 220 and/or the one or more reader systems 240 are authorized to access the storage 210, then the one or more analytics systems 220 and/or the one or more reader systems 240 may be granted access to the storage 210 to retrieve one or more data packets.

Additionally, the storage 210 of the first computing system 205 may be configured to be simultaneously accessed by the first computing system 205 to store each captured data packet and the one or more analytics systems 220 and/or the one or more reader systems 240 to retrieve the one or more stored data packets. Further, the storage 210 of the first computer may be configured to be accessed by two or more of the one or more analytics systems 220 and/or the one or more reader systems 240 to retrieve the one or more stored data packets simultaneously.

Figure 3A:
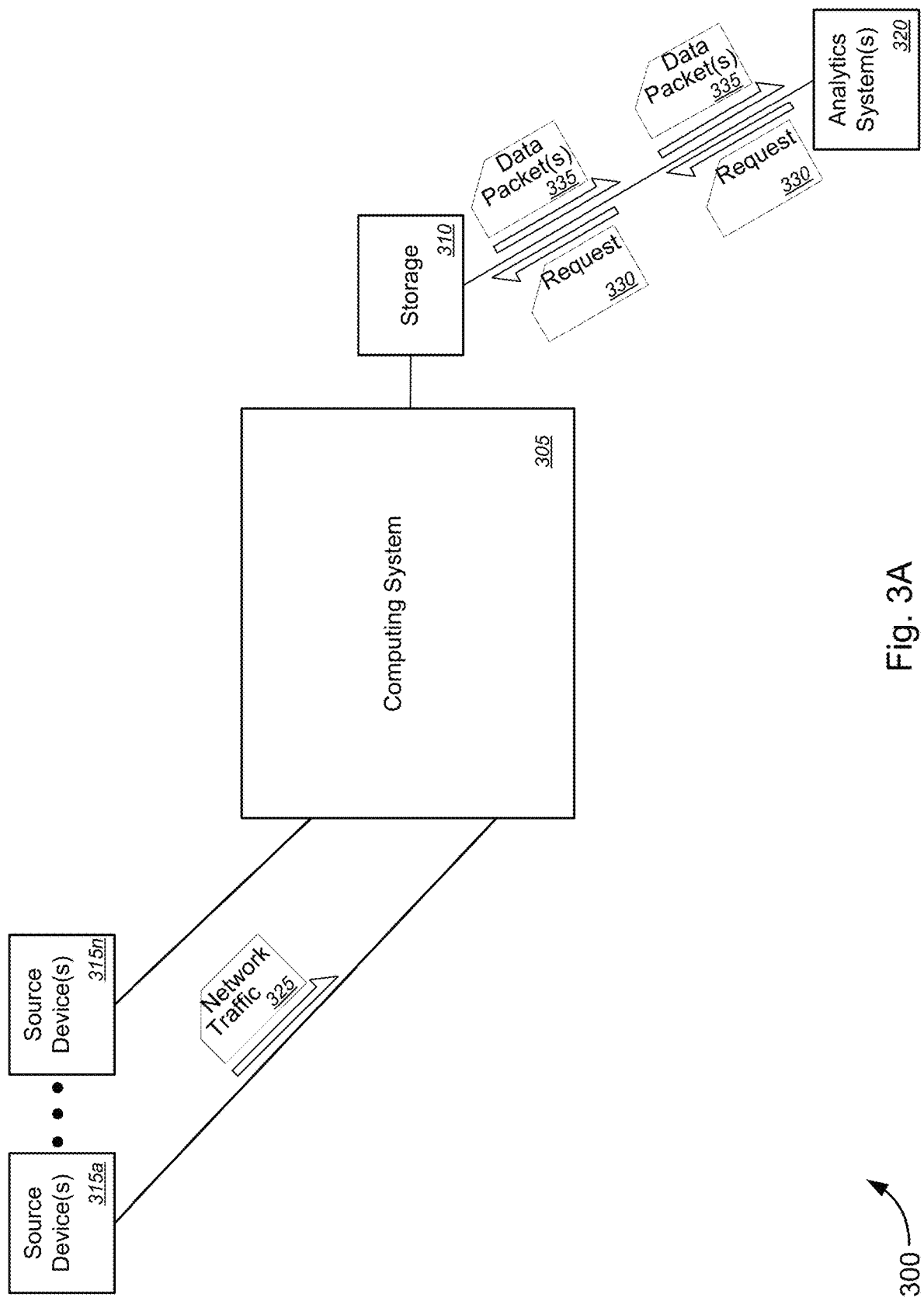
FIGS. 3A and 3B are schematic diagrams of additional systems for implementing data packet capture, data packet storage, data packet retrieval, and data packet distribution in one or more networks with different network traffic speeds, in accordance with various embodiments.
Figure 3B:
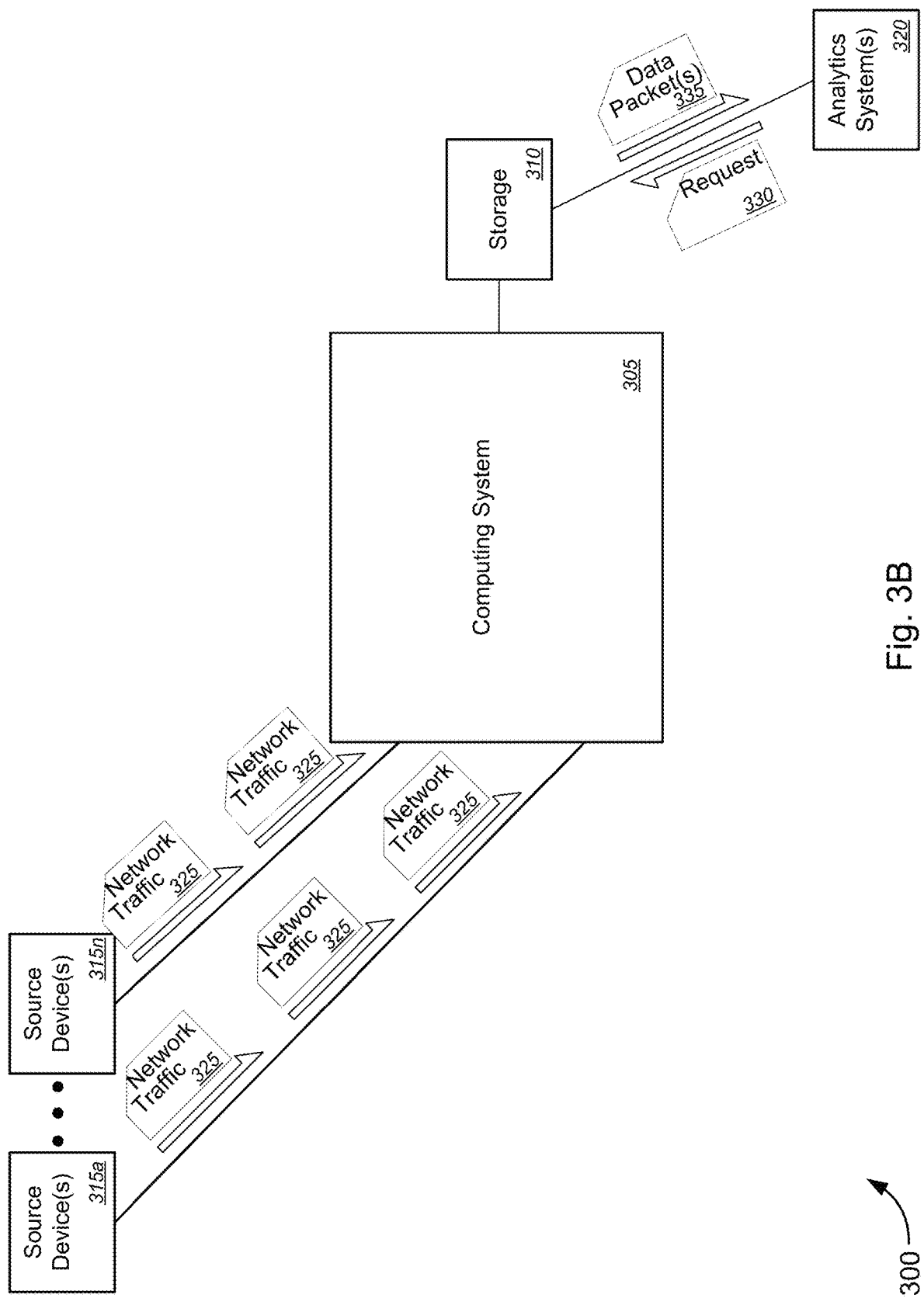

FIGS. 3A and 3B (collectively, "FIG. 3") are schematic diagrams of systems 300 for implementing data packet capture, data packet storage, data packet retrieval, and data packet distribution in one or more networks with different network traffic speeds. FIG. 3A is a schematic diagram of a system 300 for implementing data packet capture, data packet storage, data packet retrieval, and data packet distribution in a network with a slow network traffic speed or an average network traffic speed (e.g., 40 Gbps or lower). FIG. 3B is a schematic diagram of a system 300 for implementing data packet capture, data packet storage, data packet retrieval, and data packet distribution in a network with a high network traffic speed (e.g., 40 Gbps or more).

Systems 300 might comprise one or more computing systems 305 (which may correspond to the one or more computing systems 105 or 205 of FIG. 1 or 2, respectively, or the like), one or more storages 310 (which may correspond to one or more storages 110 or 210 of FIG. 1 or 2, respectively, or the like), one or more source devices 315 (which may correspond to one or more source devices 115 or 215 of FIG. 1 or 2, respectively, or the like), one or more analytics systems 320 (which may correspond to one or more analytics systems 120 or 220 of FIG. 1 or 2, respectively, or the like), and one or more networks (not shown).

Computing systems 305 and/or analytics systems 320 may be configured to track network traffic 325 and/or bandwidth at points of ingress and/or egress of the computing system 305, storage(s) 310, analytics system 320, one or more network(s), and/or the like. In this way, computing system 305 and/or analytics systems 320 may automatically determine demand for resources as well as resource utilization within the network.

Referring to the non-limiting example of FIG. 3A, computing system 305 might monitor network traffic 325 containing one or more data packets 335 in a network containing computing system 305. The network traffic may be generated by the one or more source devices 315 and transmitted to or within the network containing computing system 305. The network traffic shown in FIG. 3A is intended to represent periods of low network traffic or average network traffic (e.g., 40 Gbps or less).

During periods of low network traffic speed or average network traffic speed (e.g., 40 Gbps or lower), analytics systems 320 might send one or more requests 330 to storage 310 to retrieve one or more data packets 335 at a higher rate, at a same rate, or at a lower rate than the computing system 305 is ingesting network traffic 325. Once the one or more data packets 335 have been retrieved from storage 310, the one or more retrieved data packets 335 may be deleted from storage 310 to make room for more network traffic to be ingested by computing system 305.

In some cases, analytics systems 320 may use periods of low network traffic speed or average network traffic to catch up with requesting or accessing the one or more data packets 335 stored in storage 310. In other words, analytics systems 320 may retrieve or access one or more data packets 335 faster than the computing system 305 and storage 310 are ingesting network traffic 325. As long as the analytics systems 320 can ingest the one or more data packets faster than the average network traffic speed, analysis can be performed on the one or more data packets 335 without dropping or losing any of the data packets 335 stored in storage 310.

The storage 310 may also be configured to allow the one or more analytics systems 320 to retrieve the one or more captured data packets from the storage 310 in real-time. In order to achieve this, the storage 310 has the capability that as soon as the one or more data packets 335 are written to the storage 310, the one or more data packets 335 are produced and are capable of being read by the one or more analytics systems 320 and/or computing system 305. In some cases, the one or more data packets may be divided into one or more streams (1–n streams) based on one or more attributes to be distributed to or retrieved by the computing system 305 and/or the one or more analytics system 320. Each analytics system 320 and/or computing system 305 may be responsible for analyzing different stream types based on one or more attributes associated with each stream.

Referring to the non-limiting example of FIG. 3B, computing system 305 might monitor network traffic 325 containing one or more data packets 335 in a network containing computing system 305. The network traffic may be generated by the one or more source devices 315 and transmitted to or within the network containing computing system 305. The network traffic shown in FIG. 3B is intended to represent periods of high network traffic (e.g., 40 Gbps or more).

During periods of high network traffic speed (e.g., 40 Gbps or more), analytics systems 320 might send one or more requests 330 to storage 310 to retrieve one or more data packets 335 at a lower rate than the computing system 305 is ingesting network traffic 325. In this manner, the storage 310 acts as a buffer in the network traffic flow. Additionally, the one or more analytics systems 320 may ingest the one or more data packets 335 "at their leisure" and do not have to try to ingest the network traffic speed at the rate that the computing system 305 is ingesting the network traffic 325. Analytics systems 320 can use periods of low network traffic (shown in FIG. 3A) to catch up from periods of high network traffic and retrieve the rest of the data packets that were not retrieved during periods of high network traffic. Once the one or more data packets 335 have been retrieved from storage 310, the one or more retrieved data packets 335 may be deleted from storage 310 to make room for more network traffic to be ingested by computing system 305.

Additionally, during periods of high network traffic speed each analytics system 320 and/or computing system 305 may be responsible for analyzing different stream types based on one or more attributes associated with each stream. As network traffic speeds increase, more analytics systems 320 may be added to system 300 to continue to analyze the network traffic in real time. However, if more analytics systems 320 cannot be added, the one or more analytics systems 320 may ingest the one or more data packets 335 "at their leisure" and do not have to try to ingest the network traffic speed at the rate that the computing system 305 is ingesting the network traffic 325.

In some embodiments, the one or more analytics systems 320 and/or an operator of the one or more analytics systems 320 can prepare one or more requests 330 requesting one or more data packets 335 associated with one or more attributes. The computing system 305, storage 310, and/or analytics systems 320 may then prepare a file containing only the one or more data packets 335 matching the attributes requested by the one or more analytics systems 320 and/or an operator of the one or more analytics systems 320. In this way, attributes requested by the one or more analytics systems 320 and/or an operator of the one or more analytics systems 320 can efficiently be used to locate the data packets 335 of interest to the one or more analytics systems 320 and/or an operator of the one or more analytics systems 320 and remove extraneous data that is not of interest to the one or more analytics systems 320 and/or an operator of the one or more analytics systems 320. Extraneous data that has not be accessed or requested by the one or more analytics systems 320 and/or an operator of the one or more analytics systems 320 may be deleted from storage 310 after a predetermined period of time.

Figure 4A:
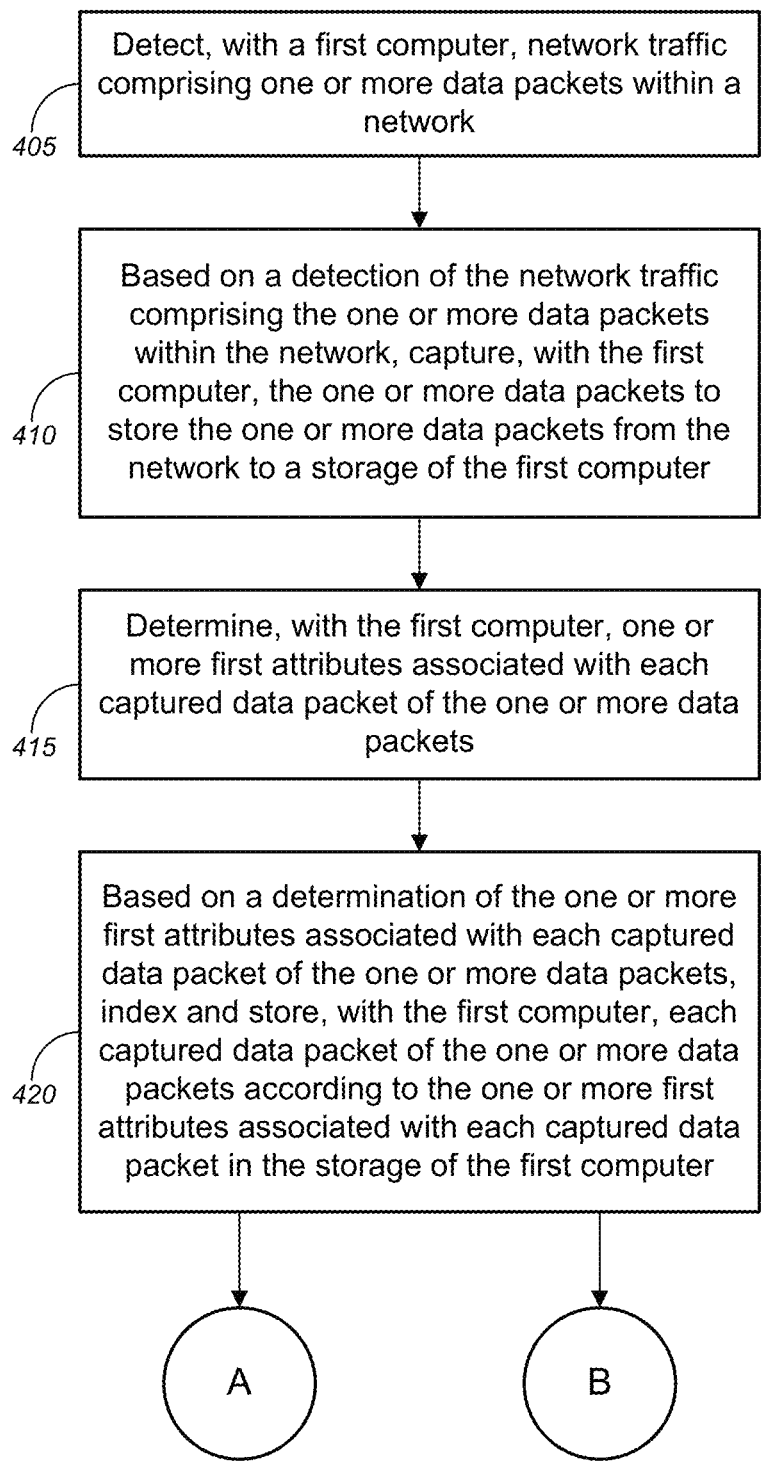
Figure 4B:
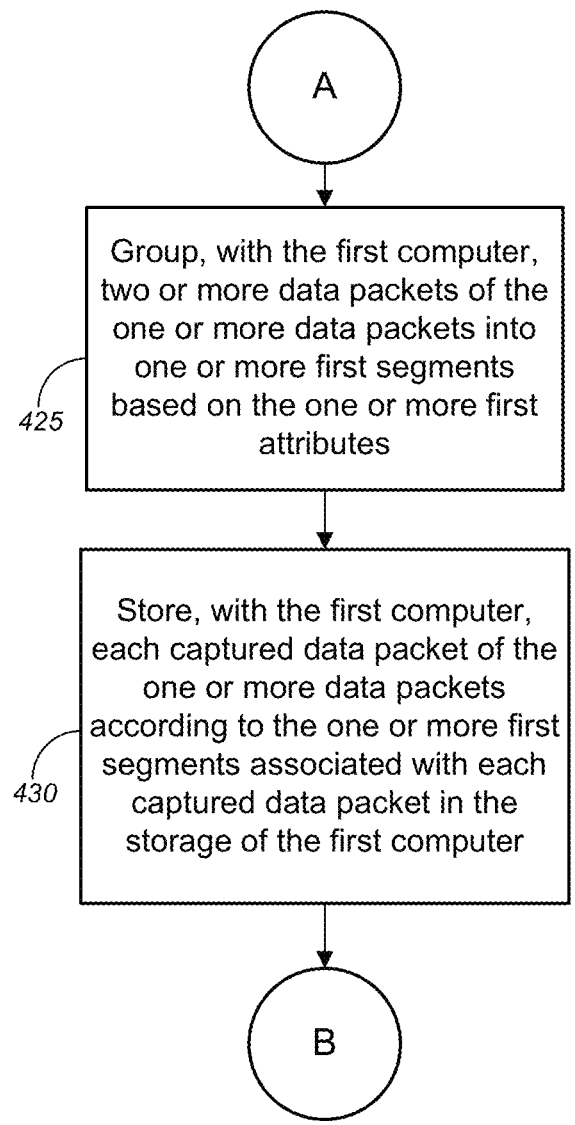

FIGS. 4A-4C (collectively, "FIG. 4") are flow diagrams illustrating a method 400 for implementing data packet capture, data packet storage, data packet retrieval, and data packet distribution, in accordance with various embodiments. Method 400 of FIG. 4A may continue onto FIG. 4B following the circular marker denoted, "A." Method 400 of FIG. 4A and FIG. 4B may continue onto FIG. 4C following the circular marker denoted, "B."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

In the non-limiting embodiment of FIG. 4A, method 400, at block 405, may comprise detecting, with a first computer, network traffic comprising one or more data packets within a network. In some embodiments, the first computer may include, without limitation, hardware, software, or a combination of hardware and software, both physical and/or virtualized. For example, in some embodiments, the first computer may refer to a software agent or probe which may be deployed. For example, in some embodiments, the first computer may be deployed on a centralized server, controller, or other computer system. Accordingly, the first computer may be implemented on, without limitation, one or more desktop computer systems, server computers, gateway devices, dedicated custom hardware appliances, programmable logic controllers, single board computers, field programmable gate arrays ("FPGA"), application specific integrated circuits ("ASIC"), or a system on a chip ("SoC"), and/or the like.

Additionally and/or alternatively, the first computer might include, without limitation, at least one of one or more service provider computers, one or more service provider devices, one or more user computers, one or more user devices, one or more consumer grade equipment, and/or the like. A service provider computer, a service provider device, a user computer, a user device, and/or a consumer grade equipment can be a general purpose computer (including, merely by way of example, a desktop computer, a tablet computer, a laptop computer, a handheld computer, and/or the like), a computing device (e.g., a residential gateway, a business gateway, a virtual gateway, and/or the like), cloud computing devices, a server(s), and/or a workstation computer(s), etc.

In some cases, the network traffic may be flowing through the network containing the first computer at an average network speed of 40 Gbps or less. Alternatively, the network traffic may be flowing through the network containing the first computer at 40 Gbps or more. In some cases, the network traffic may be flowing through the network containing the first computer at 100 Gbps or more.

The first computer may act as a single point of ingest for network traffic entering or flowing within network containing the first computer. In other words, the network traffic that the first computer receives has not been divided by a load balancer before being received by the first computer. In some cases, the first computer may be located at an edge of the network and capture one or more data packets or network traffic as the one or more data packets or network traffic enters the network containing the first computer. Additionally, the first computer might include a network connection to receive packets from other collection software in the network. The network connection may detect the one or more data packets within the network and collect the one or more data packets from the other collection software in the network. In this way, the first computer acts as the single point of ingest for network traffic entering or flowing within the network containing the first computer.

Based on a detection of the network traffic comprising one or more data packets within the network, at block 410 in FIG. 4A, method 400 may comprise, capturing, with the first computer, the one or more data packets to store the one or more data packets from the network to a storage of the first computer. The storage of the first computer acts as a buffer in the network traffic flow. The first computer sends each data packet of the one or more data packets directly to the storage of the first computer without dividing the network traffic via a load balancer.

In some embodiments, the storage of the first computer may be capable of capturing and storing the one or more data packets at 100 Gbps or more sustained for 24 hours. In other words, the network traffic flow may be flowing through the network at a network speed of 100 Gbps or more and the first computer may be able to capture the network traffic flow flowing through the network at the network speed of 100 Gbps or more and store the one or more data packets in the storage of the first computer for at least 24 hours. Because the first computer is storing the one or more data packets within a storage, the one or more data packets may be captured and stored without losing or dropping the one or more data packets.

The first computer may include a network interface card ("NIC"), and/or the like, and may detect and capture the network traffic via the NIC, and/or the like. The NIC of the first computer may send each captured data packet of the one or more data packets directly to the storage of the first computer without a load balancer. Alternatively, the network interface card sends each captured data packet to compute memory and the first computer writes each captured data packet to the storage of the first computer after the network interface card sends each captured data packet to compute memory.

Method 400 may further comprise, at block 415, determining, with the first computer, one or more first attributes associated with each captured data packet of the one or more data packets. The determination of the one or more first attributes associated with each captured data packet might occur before the one or more captured data packets are stored, as the one or more captured data packets being are stored, or after the one or more data packets are stored.

The one or more first attributes associated with each captured data packet might include, without limitation, at least one of a time stamp, an address field, an indication of an encrypted captured data packet or an unencrypted data packet, a length of each captured data packet, a protocol associated with each captured data packet, a tunneling protocol associated with each captured data packet, a virtual local area network associated with each captured data packet, a uniform resource identifier associated with each captured data packet, an indication of a method associated with capturing each captured data packet, a payload associated with each captured data packet, and/or the like. The time stamp may indicate a time each captured data packet was captured or stored. The time each captured data packet was captured or stored may be recorded to the nanosecond. The address field may be located in a header of each captured data packet and the address field may comprise at least one of an internet protocol ("IP") source address, an IP destination address, a port source address, a port destination address, and/or the like.

In some embodiments, based on a determination of the one or more first attributes associated with each captured data packet of the one or more data packets, method 400 may further comprise, at block 420, indexing and storing, with the first computer, each captured data packet of the one or more data packets according to the one or more first attributes associated with each captured data packet in the storage of the first computer.

The storage of the first computer may be both a persistent storage configured to store one or more data packets and a flow through buffer configured to distribute the one or more data packets to the first computer and/or to the one or more second computers. In this case, "distribute" means either (1) that the first computer and/or the storage may distribute the one or more data packets to the first computer and/or to the one or more second computers from the storage and/or (2) that the first computer and/or one or more second computers may be capable of accessing the storage to retrieve the one or more data packets from storage.

Method 400 may either continue onto the process at block 425 in FIG. 4B following the circular marker denoted, "A" or continue onto the process at block 435 or 450 in FIG. 4C following the circular marker denoted, "B."

At block 425 in FIG. 4B (following the circular marker denoted, "A"), method 400 may comprise grouping, with the first computer, two or more data packets of the one or more data packets into one or more first segments or one or more first conversations based on the one or more first attributes and store each captured data packet according to the one or more first segments or one or more first conversations. Additionally, method 400 may comprise, at block 430, storing, with the first computer, each captured data packet of the one or more data packets according to the one or more first segments or the one or more first conversations associated with each captured data packet in the storage of the first computer.

Each first segment or first conversation may include two or more data packets sharing one or more attributes. In a non-limiting example, each first segment or conversation may be associated with captured data packets received by the first computer within a specific time period and/or containing the same source address and/or destination address, and/or the like. Each captured data packet meeting the requirements for the first segment or conversation may be stored or indexed together. Additionally and/or alternatively, the first segment or first conversation may include two or more data packets sharing two or more attributes. In a non-limiting example, each first segment or conversation may be associated with captured data packets received by the first computer within a specific time period and containing the same source address and/or destination address, and/or the like. By grouping the one or more data packets together in this way, the one or more data packets may be easily retrieved by one or more analytics systems and/or one or more second computers. In some cases, the first computer compresses the one or more first segments comprising the two or more data packets before writing the one or more first segments to the storage of the first computer.

Method 400 may then continue onto the process at block 435 in FIG. 4C following the circular marker denoted, "B."

Method 400 may further comprise, at block 435, in FIG. 4C, determining, with one or more second computing systems and/or one or more analytics systems, one or more second attributes associated with one or more stored data packets to retrieve. The one or more second computing systems might include the first computer and/or be different and separate from the first computer. The one or more second computing systems might include, without limitation, hardware, software, or a combination of hardware and software, both physical and/or virtualized. For example, in some embodiments, the one or more second computing systems may refer to a software agent or probe which may be deployed in either a centralized or distributed configuration. For example, in some embodiments, the one or more second computing systems may be deployed on a centralized server, controller, or other computer system. In other embodiments, the one or more second computing systems may be deployed in a distributed manner, across one or more network nodes or one or more computer systems, such as servers, controllers, orchestrators, or other types of network elements, and/or the like. Accordingly, the one or more second computing systems may be implemented on, without limitation, one or more desktop computer systems, server computers, dedicated custom hardware appliances, programmable logic controllers, single board computers, field programmable gate arrays ("FPGA"), application specific integrated circuits ("ASIC"), or a system on a chip ("SoC"), and/or the like.

Additionally and/or alternatively, the one or more second computing systems might include, without limitation, at least one of one or more service provider computers, one or more service provider devices, one or more user computers, one or more user devices, one or more consumer grade equipment, and/or the like. A service provider computer, a service provider device, a user computer, a user device, and/or a consumer grade equipment can be a general purpose computer (including, merely by way of example, a desktop computer, a tablet computer, a laptop computer, a handheld computer, and/or the like), a computing device (e.g., a residential gateway, a business gateway, a virtual gateway, and/or the like), cloud computing devices, a server (s), and/or a workstation computer(s), etc.

The one or more second attributes associated with each stored data packet might include, without limitation, at least one of a time stamp, an address field, an indication of an encrypted captured data packet or an unencrypted data packet, a length of each captured data packet, a protocol associated with each captured data packet, a tunneling protocol associated with each captured data packet, a virtual local area network associated with each captured data packet, a uniform resource identifier associated with each captured data packet, an indication of a method associated with capturing each captured data packet, a payload associated with each captured data packet, and/or the like. The time stamp may indicate a time each captured data packet was captured or stored. The time each captured data packet was captured or stored may be recorded to the nanosecond. The address field may be located in a header of each captured data packet and the address field may comprise at least one of an internet protocol ("IP") source address, an IP destination address, a port source address, a port destination address, and/or the like. In order to determine which stored data packets to retrieve, the one or more second computing systems may receive input from an operator indicating which data packets to retrieve. Alternatively, the one or more second computing systems may automatically determine which data packets to retrieve.

In some cases, the one or more second computing systems might determine one or more stored data packets to retrieve from storage based on one or more second segments or one or more second conversations associated with the one or more second attributes. Each second computing system may be responsible for analyzing one or more second segments or one or more second conversations. In a non-limiting example, each second computing system may be responsible for analyzing one or more data packets associated with a particular time period, a particular source address, and/or a particular destination address, and/or the like.

At block 440, based on a determination of the one or more second attributes associated with the one or more stored data packets to retrieve, method 400 may comprise searching, with the one or more second computing systems, for the one or more stored data packets associated with the one or more second attributes stored in the storage of the first computer. According to some embodiments, method 400, at block 445, may include retrieving, with the one or more second computing systems, the one or more stored data packets stored in the storage of the first computer. In some cases, the first computer or storage may send the one or more stored data packets associated with the one or more second attributes to the one or more second computers. Alternatively, the one or more second computers may access the storage of the first computer directly and retrieve the one or more stored data packets associated with the one or more second attributes.

In a non-limiting example, the second computing systems may retrieve or ask the first computer or storage to retrieve stored data packets matching the attribute, segment, and/or conversation provided by the second computing systems. Based on the attribute, segment, and/or conversation provided by the second computing systems, the second computing systems, first computer, or storage may pull all packets matching the provided attribute, segment, and/or conversation. This enables efficient searching and retrieval by the second computing systems to pull data of interest to the second computing systems.

Additionally, the storage of the first computer may be configured to be simultaneously accessed by the first computer to store each captured data packet and the one or more second computing systems to retrieve the one or more stored data packets. Further, the storage of the first computer may be configured to be accessed by two or more second computing systems to retrieve the one or more stored data packets simultaneously. By enabling more than one device to access the storage of the first computer at one time, a separation of duties between the first computer and the one or more second computing system may be realized where the first computer can be dedicated to perform the functions of ingesting, indexing, and writing to storage the one or more captured data packets while the one or more second computing systems can be dedicated to perform the functions of retrieving, analyzing, and distributing the one or more captured data packets.

In various instances, the storage of the first computer may store the one or more captured data packets until the one or more captured data packets are retrieved by the one or more second computing systems. Additionally and/or alternatively, the storage of the first computer may store the one or more captured data packets for a predetermined amount of time (e.g., one or more minutes, one or more hours, one or more days, one or more weeks, and/or the like).

At optional block 450, the method 400 might further include sending, with the one or more second computing systems, the one or more stored data packets to one or more third computing systems to analyze the one or more stored data packets. The one or more second computing systems may send the one or more data packets to the one or more third computing systems in a flow-controlled manner. The one or more second computing systems may control the flow of the one or more stored data packets to prevent packet loss. The one or more second computers may be configured to control the flow of one or more data packet streams in such a way that the one or more second computing systems do not over send one or more data packets to the one or more third computing systems. This ensures that the one or more third computing systems do not drop the one or more data packets before the one or more data packets can be analyzed. Further, this flow control from the one or more second computing systems allows for the first computer to capture data packets at higher speeds than the one or more second computing systems and/or third computing systems receive and analyze the one or more data packets. The one or more second computing systems may then send or distribute the one or more data packets to the one or more third computing systems to perform data analytics.

Alternatively, the one or more second computing systems may perform the one or more data analytics. In this scenario, the one or more second computing systems may retrieve and analyze the one or more data packets from the storage of the first computer at the one or more second computing "leisure." This allows for the first computer to capture data packets at higher speeds than the one or more second computing systems retrieve and analyze the one or more data packets.

Alternatively, method 400 may further comprise, at block 455, in FIG. 4C, at least one of distributing, with the first computer to the more second computing systems, or accessing, with the one or more second computing systems, the one or more stored data packets in a first in first out manner. In other words, the first data packet stored in the storage may be retrieved, distributed, or accessed by the first computer, the storage, and/or the one or more second computers before retrieving other data packets. A determination of which data packets were captured first and/or stored first may be based on a time stamp associated with a time each data packet was captured or stored.

In some cases, the storage of the first computer is configured to distribute the one or more stored data packets to at least one of the first computer or the one or more second computing systems in real time by producing the one or more stored data packets immediately after the one or more stored data packets have been written to the storage of the first computer.

Exemplary System and Hardware Implementation

Figure 5:
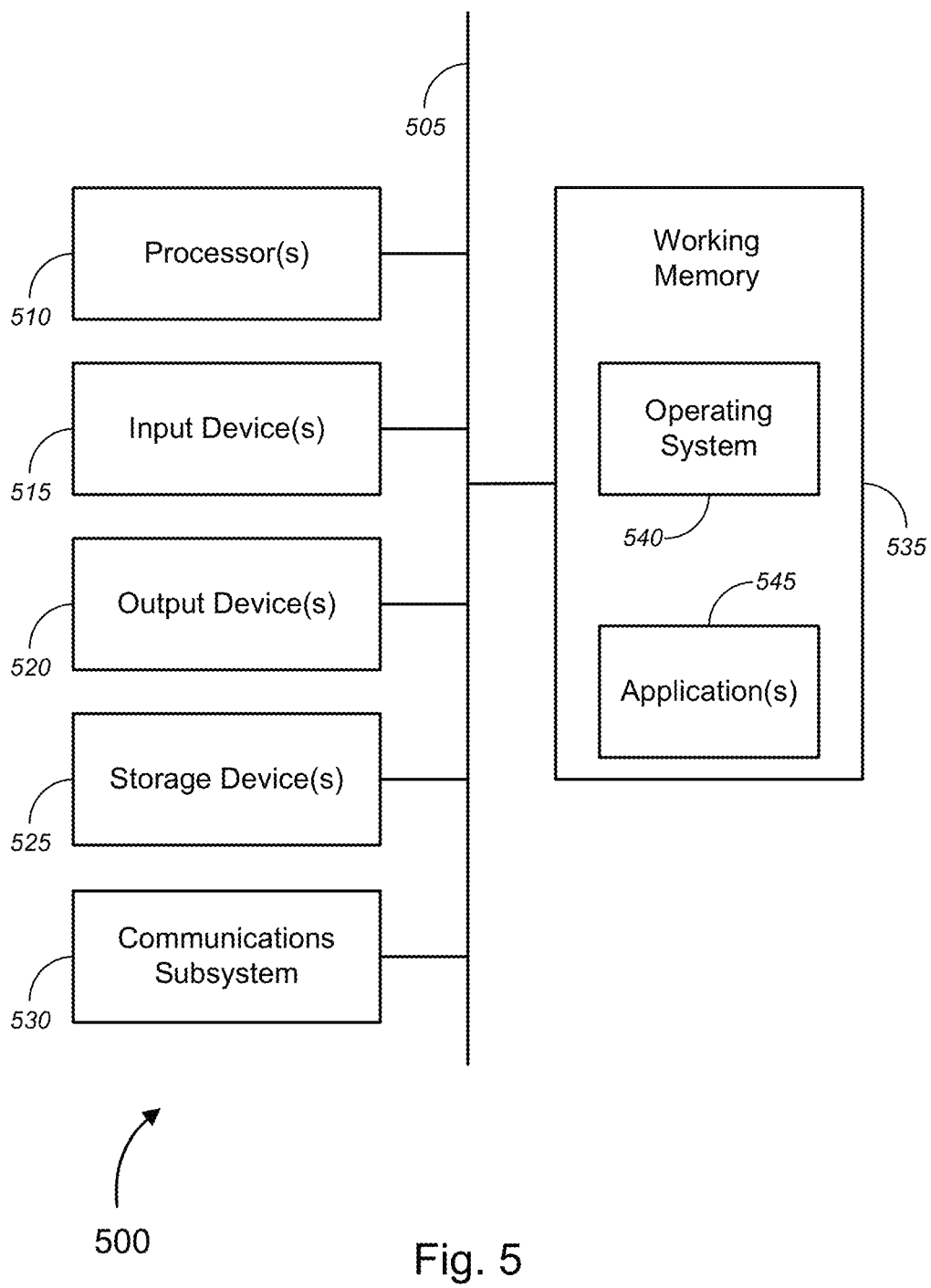
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., first computing systems 105, 205, and 305, storages 110, 210, and 310, source devices 115, 215, and 315, analytics systems 120, 220, and 320, duplication systems 225, destination devices 230, security system 235, and reader system 240 etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., first computing systems 105, 205, and 305, storages 110, 210, and 310, source devices 115, 215, and 315, analytics systems 120, 220, and 320, duplication systems 225, destination devices 230, security system 235, and reader system 240 etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a storage device 525 either before or after execution by the processor(s) 510.

Figure 6:
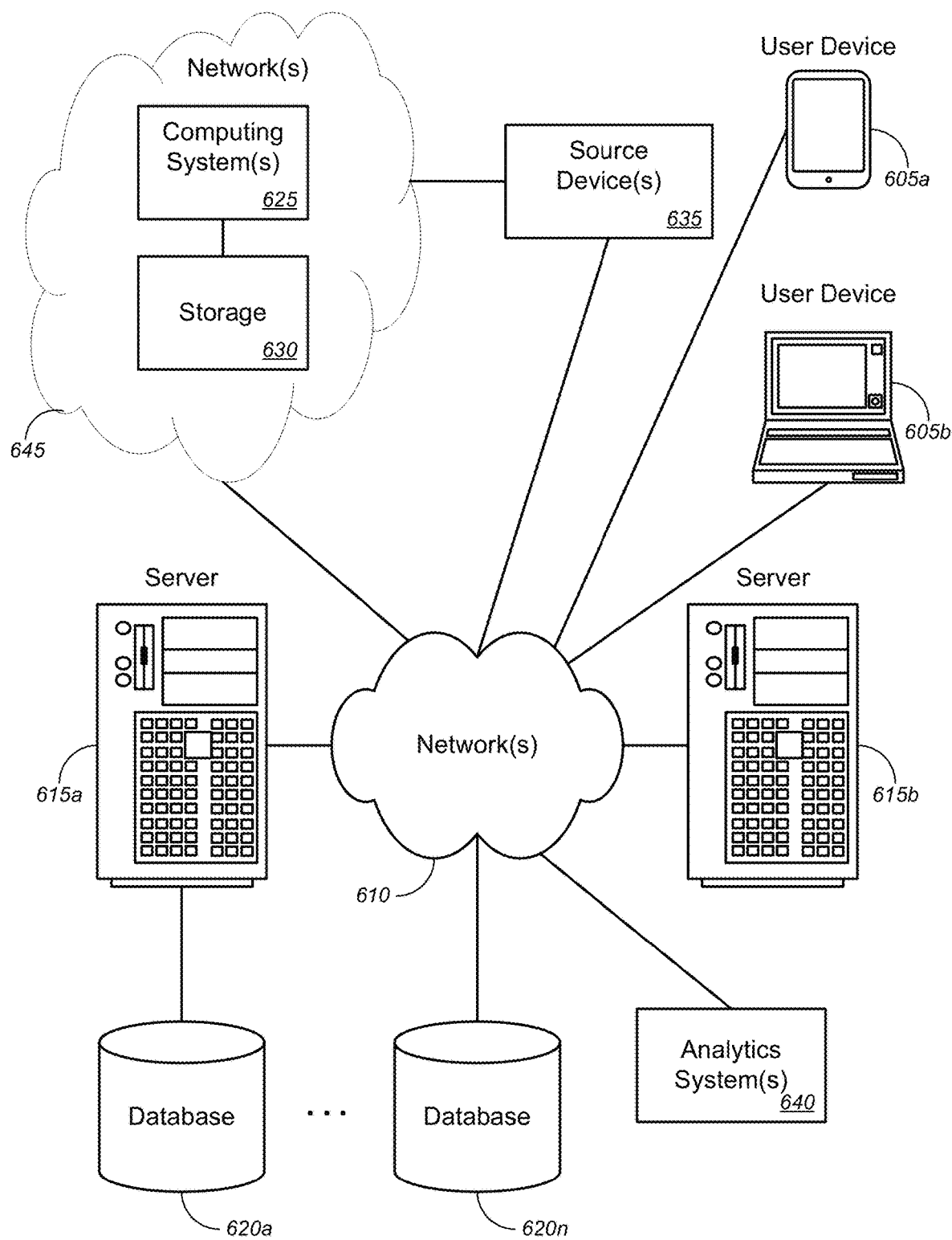
FIG. 6 is a block diagram illustrating a networked system of computers, computing systems, or system hardware architecture, which can be used in accordance with various embodiments.

As noted above, a set of embodiments comprises methods and systems for implementing data packet processing, and, in particular embodiments, to methods, systems, and apparatuses for implementing data packet capture, data packet storage, data packet retrieval, and data packet distribution. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 125a, 125b, and 125c of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing data packet processing, and, in particular embodiments, to methods, systems, and apparatuses for implementing data packet capture, data packet storage, data packet retrieval, and data packet distribution, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to first computing system 105 of FIG. 1, or the like) and corresponding storage(s) 630 (similar to storage(s) 110 of FIG. 1, or the like), one or more source devices 635 (similar to the one or more source devices 115a-115n of FIG. 1, or the like), one or more analytics systems or second computers 640 (similar to the one or more analytics systems or second computers 120a-120n of FIG. 1, or the like), and one or more networks 645 (similar to the one or more networks 125a, 125b, and 125c of FIG. 1, or the like).

In operation, computing system 625 may perform data packet processing. The computing system 625 might detect network traffic coming from one or more source devices 635 to the network 645. The network traffic might include one or more data packets. Based on a detection of network traffic comprising the one or more data packets within the network 645, the computing system 625 might capture the one or more data packets to move the one or more data packets from the network 645 to a storage 630 of the first computer. Next, the computing system 625 might determine one or more first attributes associated with each captured data packet of the one or more data packets. Based on a determination of the one or more first attributes associated with each captured data packet of the one or more data packets, the computing system 625 might index and store each captured data packet of the one or more data packets according to the one or more first attributes associated with each captured data packet in the storage 630 of the computing system 625.

In some cases, the one or more analytics systems 640 might determine one or more second attributes associated with one or more stored data packets to retrieve from storage 630. Based on a determination of the one or more second attributes associated with the one or more stored data packets to retrieve from storage 630, the one or more analytics systems 640 might search for the one or more stored data packets associated with the one or more second attributes stored in the storage 630 of the computing system 625. Further, the one or more analytics systems 640 might retrieve the one or more captured data packets stored in the storage 630 of the computing system 625.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for performing data packet processing, comprising:
   detecting, with a first computer, network traffic comprising one or more data packets within a network;
   based on a detection of the network traffic comprising the one or more data packets within the network, capturing, with the first computer, the one or more data packets;
   storing the one or more data packets captured from the network to a storage of the first computer, wherein the storage is a persistent storage, wherein storing further comprises:
      determining, with the first computer, one or more first attributes associated with each captured data packet of the one or more data packets; and
      based on a determination of the one or more first attributes associated with each captured data packet of the one or more data packets, indexing and storing, with the first computer, each captured data packet of the one or more data packets according to the one or more first attributes respectively associated with each captured data packet in the storage of the first computer; and
   distributing one or more stored data packets stored on the storage to at least one of the first computer or one or more second computing systems simultaneously with the storing of the one or more data packets captured from the network to the storage.

2. The method of claim 1, wherein the network traffic is flowing through the network at a network speed of 100 gigabits per second ("Gbps") or more.

3. The method of claim 2, wherein the first computer is able to capture the network traffic flowing through the network at the network speed of 100 Gbps or more and store the one or more data packets in the storage of the first computer.

4. The method of claim 1, wherein the first computer sends each captured data packet of the one or more data packets directly to the storage of the first computer, without a load balancer.

5. The method of claim 1, wherein the storage includes a flow through buffer for distributing data to at least one of the first computer or the one or more second computers.

6. The method of claim 1, wherein the first computer comprises a network interface card, and wherein the network interface card detects the one or more data packets within the network and captures the one or more data packets.

7. The method of claim 6, wherein the network interface card sends each data packet of the one or more data packets directly to the storage of the first computer, without a load balancer.

8. The method of claim 6, wherein the network interface card sends each captured data packet to compute memory and wherein the first computer writes each captured data packet to the storage of the first computer.

9. The method of claim 1, wherein the first computer comprises a network connection to receive packets from other devices in the network, and wherein the network connection detects the one or more data packets within the network and captures the one or more data packets from the other devices in the network.

10. The method of claim 1, wherein the one or more first attributes associated with each captured data packet comprises at least one of a time stamp, an address field, a first indication of an encrypted captured data packet or an unencrypted data packet, a length of each captured data packet, a protocol associated with each captured data packet, a tunneling protocol associated with each captured data packet, a virtual local area network associated with each captured data packet, a uniform resource identifier associated with each captured data packet, a second indication of a method associated with capturing each captured data packet, or a payload associated with each captured data packet.

11. The method of claim 10, wherein the time stamp indicates a time each captured data packet was captured or stored.

12. The method of claim 10, wherein the address field is located in a header of each captured data packet and wherein the address field comprises at least one of an internet protocol ("IP") source address, an IP destination address, a port source address, or a port destination address.

13. The method of claim 1, further comprising:
   grouping, with the first computer, two or more data packets of the one or more data packets into one or more first segments based on the one or more first attributes; and
   storing, with the first computer, each captured data packet of the one or more data packets according to the one or more first segments associated with each captured data packet in the storage of the first computer.

14. The method of claim 13, wherein the first computer compresses the one or more first segments comprising the two or more data packets before writing the one or more first segments to the storage of the first computer.

15. The method of claim 1, wherein indexing and storing each captured data packet of the one or more data packets according to the one or more first attributes associated with each captured data packet in the storage of the first computer, further comprises at least one of indexing each captured data packet while simultaneously storing each captured data packet or indexing each captured data packet before storing each captured data packet.

16. The method of claim 1, wherein indexing and storing each captured data packet of the one or more data packets according to the one or more first attributes associated with each captured data packet in the storage of the first computer, further comprises indexing each captured data packet after each captured data packet has been stored.

17. The method of claim 1, further comprising:
   determining, with the one or more second computing systems, one or more second attributes associated with the one or more stored data packets to retrieve;
   based on a determination of the one or more second attributes associated with the one or more stored data packets to retrieve, searching, with the one or more second computing systems, for the one or more stored data packets associated with the one or more second attributes stored in the storage of the first computer; and
   retrieving, with the one or more second computing systems, the one or more stored data packets stored in the storage of the first computer.

18. The method of claim 17, wherein the one or more second computing systems are different and remote from the first computer.

19. The method of claim 17, wherein the storage of the first computer is configured to be accessed by the first computer to store each captured data packet and the one or more second computing systems to retrieve the one or more stored data packets simultaneously.

20. The method of claim 17, wherein the storage of the first computer is configured to be accessed by two or more second computing systems to retrieve the one or more stored data packets simultaneously.

21. The method of claim 17, further comprising:
sending, with at least one the one or more second computing systems, the one or more stored data packets to one or more third computing systems in a flow controlled manner, wherein the one or more third computing systems is configured to analyze the one or more stored data packets, wherein the at least one of the one or more second computing systems controls a flow of the one or more stored data packets to prevent packet loss.

22. The method of claim 1, further comprising:
at least one of distributing, with the first computer to the one or more second computing systems, or accessing, with the one or more second computing systems, the one or more stored data packets in a first in first out manner.

23. The method of claim 1, wherein the storage of the first computer is configured to distribute the one or more stored data packets to at least one of the first computer or the one or more second computing systems in real time by producing the one or more stored data packets immediately after the one or more stored data packets have been written to the storage of the first computer.

24. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
 detect network traffic comprising one or more data packets within a network;
 based on a detection of the network traffic comprising the one or more data packets within the network, capture the one or more data packets;
 store the one or more data packets captured from the network to a storage, wherein the storage is a persistent storage, wherein storing further comprises:
  determine one or more first attributes associated with each captured data packet of the one or more data packets; and
  based on a determination of the one or more first attributes associated with each captured data packet of the one or more data packets, index and store each captured data packet of the one or more data packets according to the one or more first attributes associated with each captured data packet in the storage; and
 distribute one or more stored data packets of the storage to at least one of the at least one processor or one or more second computing systems simultaneously with the storing of the one or more data packets captured from the network to the storage.

25. A system, comprising:
a first computer, comprising:
 at least one processor; and
 a non-transitory computer readable medium communicatively coupled to the at least one processor, the non-transitory computer readable medium having stored thereon computer software comprising a set of instructions that, when executed by the at least one processor, causes the first computer to:
  detect network traffic comprising one or more data packets within a network;
  based on a detection of the network traffic comprising the one or more data packets within the network, capture the one or more data packets;
  store the one or more data packets captured from the network to a storage of the first computer, wherein the storage is a persistent storage, wherein storing further comprises:
   determine one or more first attributes associated with each captured data packet of the one or more data packets; and
   based on a determination of the one or more first attributes associated with each captured data packet of the one or more data packets, index and store each captured data packet of the one or more data packets according to the one or more first attributes associated with each captured data packet in the storage of the first computer; and
  distribute one or more stored data packets of the storage to at least one of the first computer or one or more second computing systems simultaneously with the storing of the one or more data packets captured from the network to the storage.

* * * * *